United States Patent [19]

Kindermann et al.

[11] Patent Number: 4,627,235

[45] Date of Patent: Dec. 9, 1986

[54] COMPACT ELECTROHYDRAULIC DRIVE FOR VALVES OF TURBOMACHINES, ESPECIALLY TURBINES

[75] Inventors: Wolfgang Kindermann; Ernst Kloster; Hans-Joachim Leupers; Helmut Schaper, all of Mülheim/Ruhr, Fed. Rep. of Germany

[73] Assignee: Kraftwerk Union Aktiengesellschaft, Mülheim, Fed. Rep. of Germany

[21] Appl. No.: 589,661

[22] Filed: Mar. 14, 1984

[30] Foreign Application Priority Data

Mar. 16, 1983 [DE] Fed. Rep. of Germany ....... 3309421
Jan. 9, 1984 [DE] Fed. Rep. of Germany ....... 3400488

[51] Int. Cl.[4] .............................................. F16D 31/02
[52] U.S. Cl. ........................................ 60/415; 60/416; 60/418; 91/459; 91/461; 417/310
[58] Field of Search ................. 60/413, 415, 416, 418; 91/461, 459, 449, 450; 417/307, 310

[56] References Cited

U.S. PATENT DOCUMENTS 3,906,726 9/1975 Jameson ........................... 60/413 X
4,065,094 12/1977 Adams ................................. 60/416
4,142,368 3/1979 Mantegani ............................ 60/413
4,475,710 10/1984 Leupers ............................ 60/413 X

*Primary Examiner*—Edward K. Look
*Attorney, Agent, or Firm*—Herbert L. Lerner; Laurence A. Greenberg

[57] ABSTRACT

An electrohydraulic compact drive for turbomachine valves includes: a device for supplying electric power, receiving electrical addressing signals and converting the signals into positioning and control variables; an hydraulic supply system including a fluid tank, pump, motor, accumulator and manifold; an hydraulic power piston/cylinder system including a piston rod connected to a valve, and a spring biasing the piston; an electrohydraulic addressing system generating a pressurized fluid flow opening the valve spindle against the spring dependent upon the variables; control members of the addressing system, the power system and the supply system forming a compact drive block at a valve; the pump being switched as a function of a pressure limit by intermittent charging and discharging operations between the charging pressures; the pump charging the accumulator in charging operation until the upper pressure is reached and, after being switched, returning the fluid to the tank in substantially pressureless circulating operation until the lower pressure is reached and being switched to the charging operation depending on the pressure limit; and the usable accumulator volume and the lower charging pressure being sufficiently high for extreme control processes so that:

$$AV = \int_{P_{min}}^{P_m} dpv,$$

AV being the work capacity of the accumulator,
$P_{min}$ the minimum operating pressure of the supply system,
$P_m$ the charging pressure, and
dv the time-dependent increase of the equalizing volume of the accumulator for decreasing accumulator pressure.

11 Claims, 40 Drawing Figures

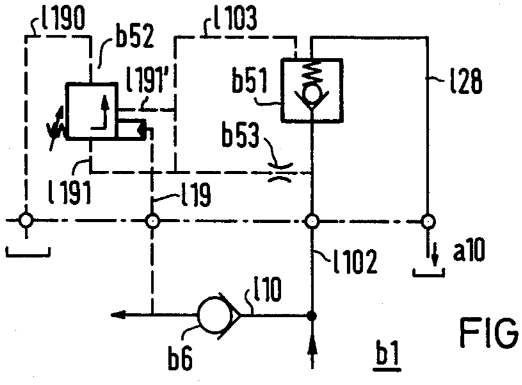
FIG 5
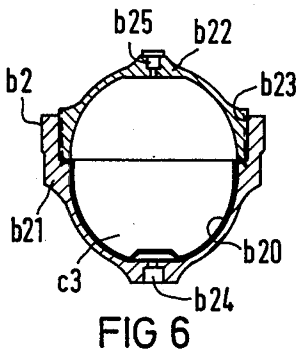
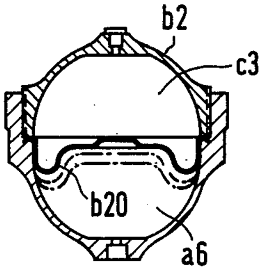
FIG 6 FIG 7
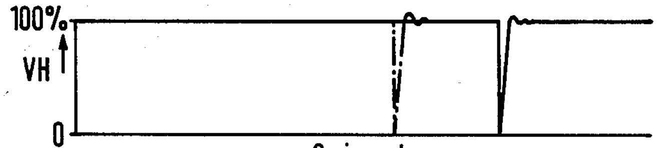
FIG 9
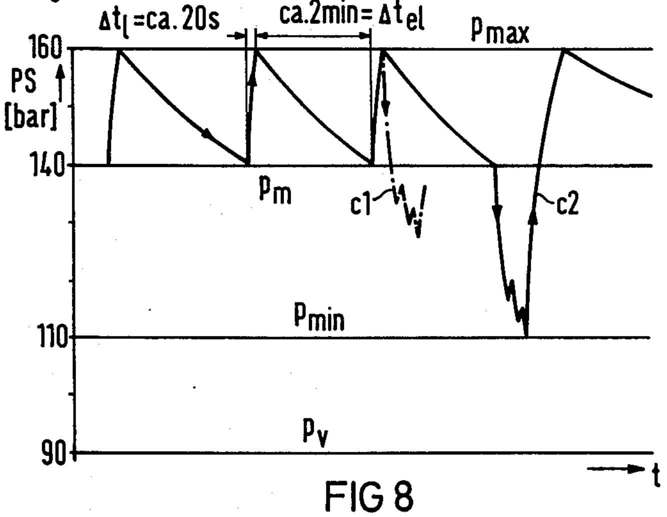
FIG 8
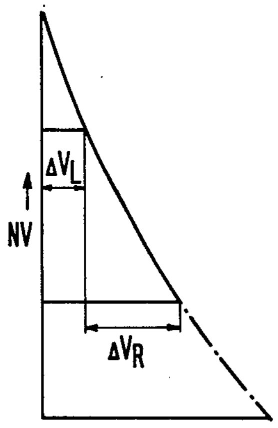
FIG 10

L1
L2
L3
aa
a1
a2
a4
a5
a7
a9
a10
a51
a100
a101
a102
a104
a106
a110
a120
b1
b2
b3
b6
b10
b500
d1
d4
d5
d6
d7
d8h
d8l
d8s
d9
d61
e1
e2
e3
e4
e5
e9
48P
110
120
XIX

| | AV 560 | |
|---|---|---|
| | KW | % |
| | 5,5 | 100 |
| | 0,14 | 2,5 |
| | 4,3 | 78 |
| | ca.0,5 | 9 |
| | 16 | 290 |
| | 160 | 2900 |

FIG 37

COMPACT ELECTROHYDRAULIC DRIVE FOR VALVES OF TURBOMACHINES, ESPECIALLY TURBINES

The invention relates to a compact electrohydraulic drive for valves of turbomachines, especially steam turbines such as control, quick-acting shutoff or bypass valves, including means for supplying electric power, for receiving electrical addressing signals as well as for converting the signals into corresponding hydraulic positioning or control variables; a self-sufficient hydraulic supply system having at least one fluid pump fed from an hydraulic fluid tank and driven by an electric motor, at least one hydraulic accumulator connected to the outlet side of the pump, and an hydraulic manifold connected to the accumulator; an hydraulic power piston/cylinder system having a piston rod connected to the valve spindle, a shutoff spring for acting on the piston rod, electrohydraulic control members of an electrohydraulic addressing system acting on the piston rod against the force of the spring by generating opening and closing motions and positions of the valve spindle in dependence on the positioning and control variables by means of a pressurized fluid flow fed from the accumulators; and the electrohydraulic addressing system, the hydraulic power piston/cylinder system and the hydraulic supply system being integrated to form a compact drive block disposed at the valve housing.

Such a compact electrohydraulic drive is known from German Published, Non-Prosecuted Application DE-OS No., 30 19 602 Al. The present invention relates to a further development, i.e., an improved structure and operation of this conventional compact drive.

It is accordingly on object of the invention to provide a compact electrohydraulic drive for valves of turbomachines, especially turbines, which overcomes the disadvantages of the heretofore-known devices of this general type, by providing that:

the entire overall volume of the device, especially that of the hydraulic supply system, of its components and of the hydraulic servo piston/cylinder system, can be reduced further;

the individual components of the hydraulic supply system, the electrohydraulic driving system and the servo piston/cylinder system including the shutoff spring have a long service life;

large valve closing and opening forces can be achieved with the new compact drive with high reliability and accuracy of the drive functions and in particular, fail-safe behavior; and the compact drive is suitable for modular construction, where different types of valves can be combined from a few basic modules of different power rating, such as main steam valves (control and quick-acting shutoff valves), intercept valves and bypass valves, With the foregoing and other objects in view there is provided, in accordance with the invention, an electrohydraulic compact drive for turbomachine valves, especially steam turbines such as control, fast-acting shutoff or bypass valves, having valve housings and spindles, comprising:

means for supplying electric power and for receiving electrical addressing signals;

means connected to the supplying and receiving means for converting the signals into corresponding hydraulic positioning and control variables;

a self-sufficient hydraulic supply system including an hydraulic fluid tank for hydraulic fluid connected to the converting means, at least one fluid pump having an inlet side fed by the fluid tank and an outlet side, an electric motor driving the fluid pump, at least one hydraulic accumulator with a given usable volume connected to the outlet side of the pump, and an hydraulic manifold connected to the at least one accumulator;

a hydraulic power system including a control cylinder, a power piston movable in the cylinder, a piston rod connected from the piston to the valve spindle of a turbomachine valve, and a shutoff spring biasing the piston with a closing motion in a closing direction of the valve spindle;

an electrohydraulic addressing system including control organs connected to the hydraulic manifold, to the hydraulic power system and to the hydraulic fluid tank for generating a pressurized fluid flow from the at least one accumulator to the hydraulic power system or for relieving the power system causing an opening or closing motion and positions of the valve spindle against the force of the shutoff spring dependent upon the positioning and control variables;

the control members of the electrohydraulic addressing system, the hydraulic power system and the hydraulic supply system being integrated into a compact drive block disposed at the housing of a turbomachine valve;

the at least one fluid pump producing a system pressure at the outlet side thereof up to a given pressure limit, the system pressure being several times higher than the fluid pressure of substantially 36-bar in conventional electrohydraulic control drives with a central fluid pressure supply;

the at least one fluid pump performing switching operations as a function of the pressure limit by intermittent charging and discharging operations switching between given upper and lower charging pressures protecting the pump and saving energy;

the at least one pump charging the at least one accumulator in the charging operation until the upper charging pressure is reached and returning the hydraulic fluid to the hydraulic fluid tank in substantially pressureless circulating operation after one of the switching operations, until the lower charging pressure is reached and one of the switching operations switches to the charging operation depending on the pressure limit; and the usable accumulator volume and the lower charging pressure being sufficiently high for extreme control processes such that:

$$AV = \int_{P_{min}}^{P_m} p\,dv$$

is available, where

AV is the work capacity of the at least one accumulator, $p_{min}$ is the minimum operating pressure of the supply system, $p_m$ is the lower charging pressure, and dv is the time-dependent increase of the equalizing volume of the accumulator for decreasing accumulator pressure.

In accordance with another feature of the invention, there are provided formed-on or added housing sections of the hydraulic supply system, the hydraulic power system and the electrohydraulic addressing system, and a central supporting substantially, cup-shaped housing for the housing sections, the closing or shutoff spring being guided on the piston rod, and the hydraulic fluid tank being in the form of an installation space for the shutoff spring and the substantially cup-shaped housing.

In accordance with a further feature of the invention, the shutoff spring is disposed outside the control cylinder and has a spring diameter which is larger and preferably substantially larger than the diameter of the power piston.

In accordance with an added feature of the invention, the shutoff spring is in the form of a stack of cup springs.

In accordance with an additional feature of the invention, the shutoff spring is cocked in an open condition of the valve spindle, the hydraulic power system is acted upon in one direction, the power piston has one side acted upon by pressure, and the pressurized fluid flow causes hydraulic pressure relief of the one side of the power piston for the closing motion, releasing the shutoff spring.

In accordance with again another feature of the invention, the at least one pump operates by the displacement principle.

In accordance with again a further feature of the invention, the at least one pump is a rotary piston pump.

In accordance with again an added feature of the invention, the at least one pump is an internal gear pump.

In accordance with again an additional feature of the invention, there is provided a pressure line leading from the outlet side of the pump to the accumulator, at least one overflow valve serving as an accumulator charging valve connected to the pressure line of the pump, a run-off line connected from the overflow valve to the discharge or hydraulic fluid tank or reservoir having a given inlet cross section, the overflow valve having a seat valve controlled by the accumulator, the pump and run-off pressure connecting the outlet side of the pump to the hydraulic fluid tank if the upper charging pressure of the accumulator is reached in the charging operation, a check valve connected to the pressure line downstream of the overflow valve as seen from the pump, the check valve being opened and the given inlet cross section of the runoff line being closed by the seat valve so as to connect the outlet side of the pump via the pressure line of the pump to the accumulator if the charging pressure of the accumulator has dropped to the lower charging pressure in the discharging operation of the accumulator.

In accordance with yet another feature of the invention, the seat valve of the overflow valve is a two-way seat valve functioning in open, closed and pressure valve operation, and the overflow valve also includes a pressure-dependent servo stage upstream of the seat valve.

In accordance with yet a further feature of the invention, the servo stage is a pressure-dependent hydraulic discrete resistance for relieving and charging or acting upon the two-way seat valve when the respective upper charging pressure and lower charging pressure are reached by respectively opening and closing a control cross section.

In accordance with yet an added feature of the invention, the servo stage is spring-loaded.

In accordance with a concomitant feature of the invention, the servo stage includes a hydraulic-electrically operating pressure measuring transducer and a magnetic valve connected to the measuring transducer for receiving limit signals of the upper and lower charging pressures from the measuring transducer and for opening and closing the two-way seat valve in dependence on the limit signals.

The advantages attainable through the use of the invention are seen particularly in the fact that, by increasing the pressure in the hydraulic supply system to an average system pressure of, for instance, 140-bar (this value being about four-times higher than the system pressure in conventional electrohydraulic controls which is about 36-bar), large positioning or switching forces of the servo piston can be achieved with a small overall volume of the servo piston/cylinder system and with a small overall volume of the other components of the hydraulic supply system such as pumps and accumulators. In spite of this high average system pressure, overloading the pump or the pumps is impossible due to the intermittent charging and discharging operation, and energy savings are obtained. Due to the high average system pressure, the pressure fluid container or oil container (also referred to as a tank) can in turn be made relatively small but large enough to serve as a space for the installation of the shutoff spring guided on the piston rod. Thus, the pressure fluid container forms the central supporting housing for added-on housing sections in modular construction; its wall thickness is adjusted accordingly, and an added advantage is that the container walls and its covers can serve for accomodating hydraulic canals.

Other features which are considered as characteristic for the invention are set forth in the appended claims.

Although the invention is illustrated and described herein as embodied in a compact electrohydraulic drive for valves of turbomachines, especially turbines, it is nevertheless not intended to be limited to the details shown, since various modifications and structural changes may be made therein without departing from the spirit of the invention and within the scope and range of equivalents of the claims The construction and method of operation of the invention, however, together with additional objects and advantages thereof will be best understood from the following description of specific embodiments when read in connection with the accompanying drawings, in which:

FIG. 5 is a detailed schematic switching diagram of the overflow valve according to FIGS. 3 and 4;

FIGS. 6 and 7 are cross-sectional views of accumulators used in the hydraulic supply system, wherein FIG. 6 shows a diaphragm accumulator filled only with gas at the prefilling pressure, and FIG. 7 shows a diaphragm accumulator with a pressure fluid at three different charging pressures;

FIGS. 8, 9 and 10 are graphs showing the time behavior of the hydraulic supply system, wherein PS designates the accumulator charging pressure, VH designates the valve stroke, NV designates the usuable volume (ordinate axes) and t designates the time (abscissa axes);

Figure 18:
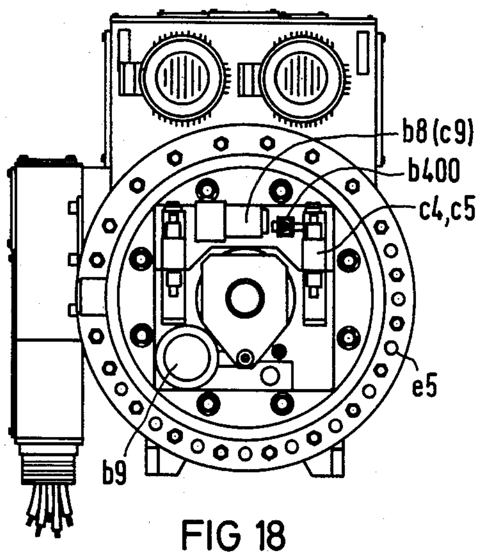
Figure 19:
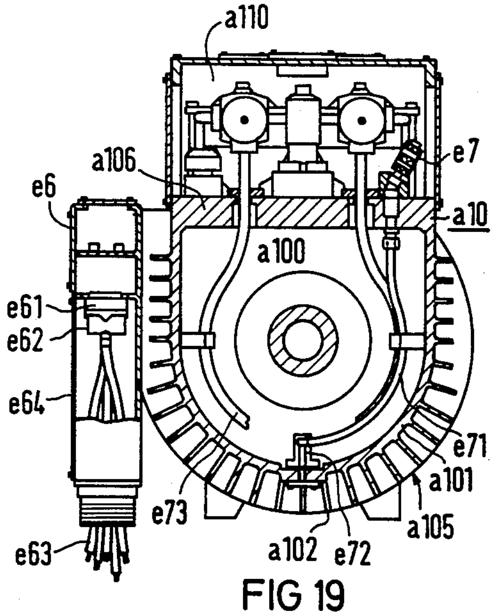
Figure 16:
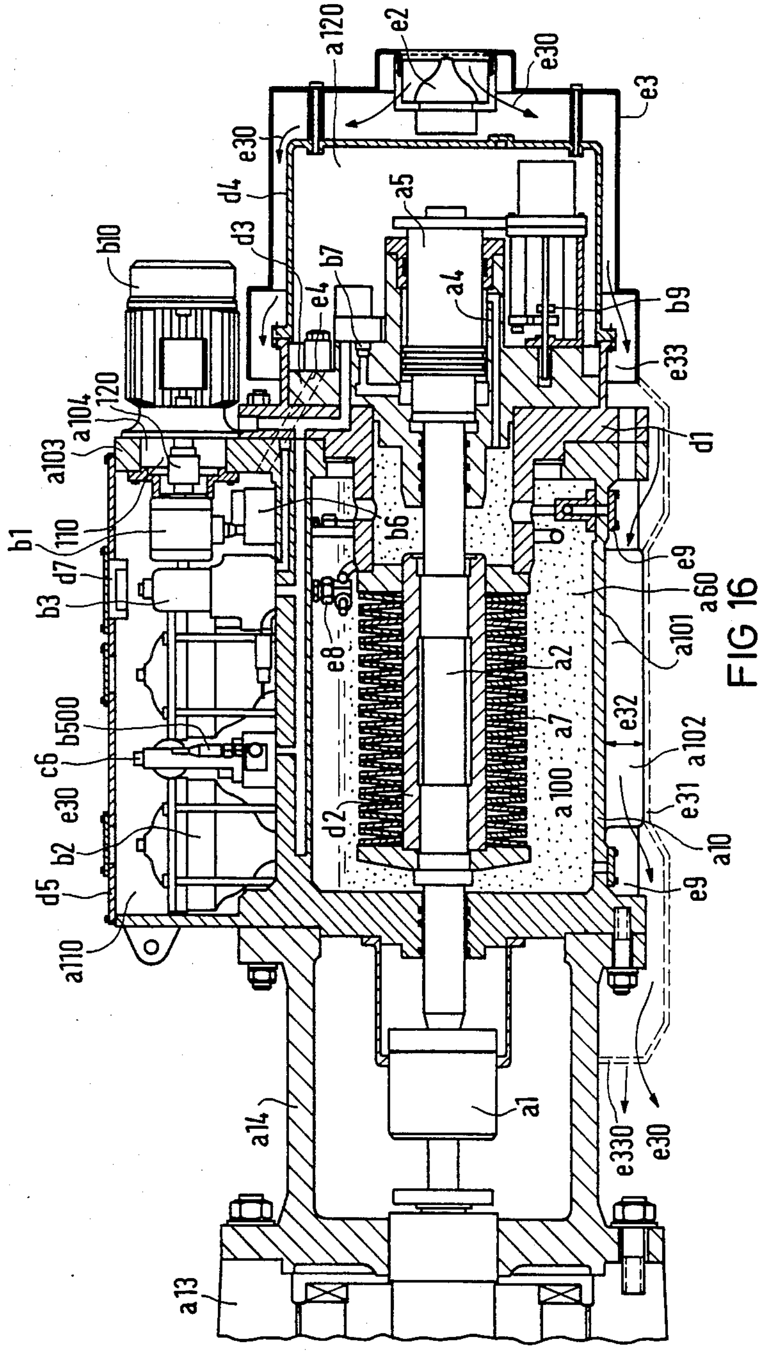
FIG. 16 is a longitudinal sectional view of a preferred mechanical structure of the compact drive in the form of a positioning drive, with an extension of the cooling air hood shown in broken lines.
Figures 17, 17A, 17B, 17C:
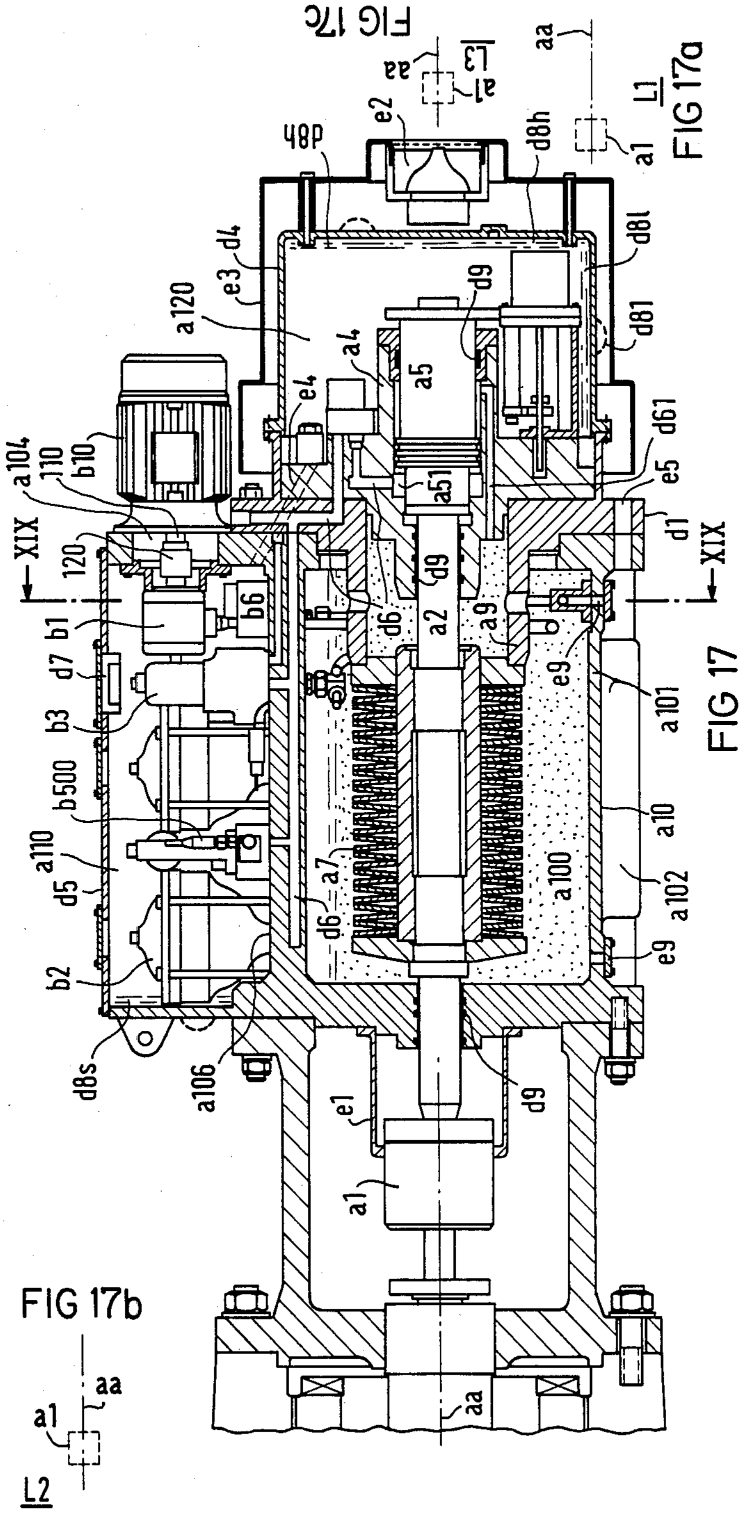
Figure 20:
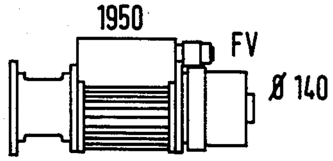
Figure 23:
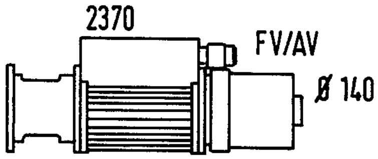
Figure 21:
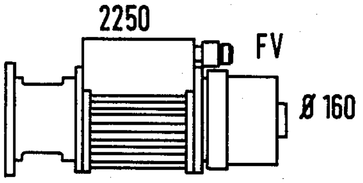
Figure 24:
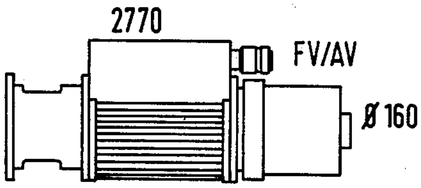
Figure 22:
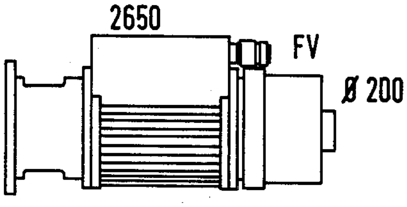
Figure 25:
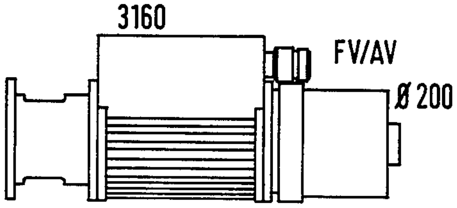
Figure 26:
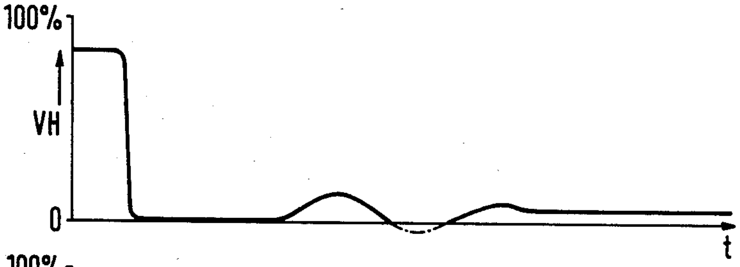
Figure 27:
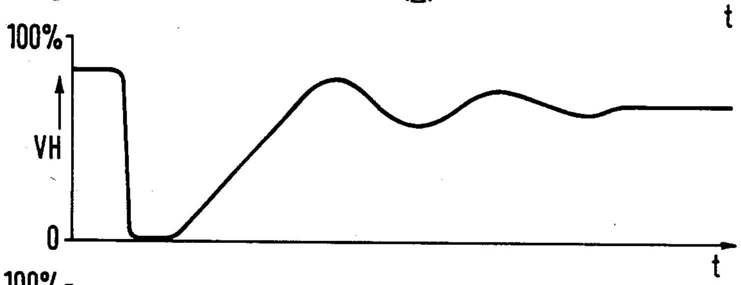
Figure 28:
Figure 29:
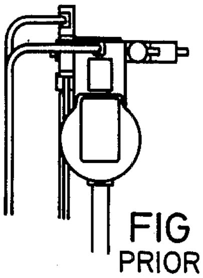
FIG 29 PRIOR ART
Figure 30:
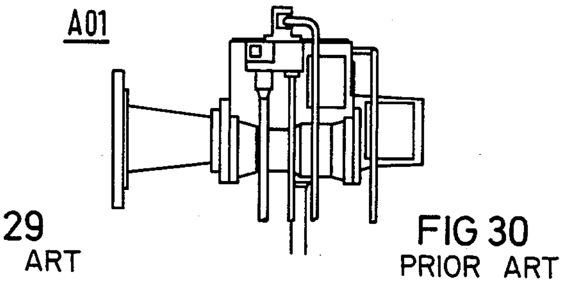
FIG 30 PRIOR ART
Figure 31:
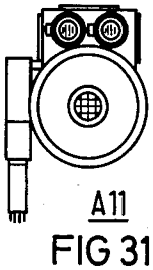
Figure 32:
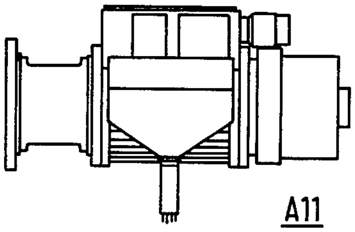
Figure 33:
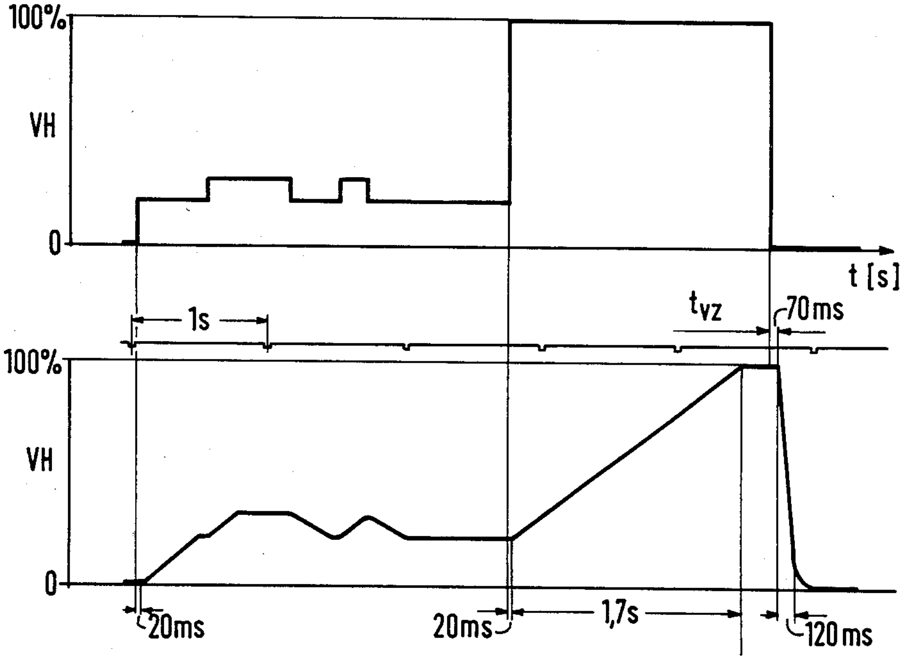
Figure 34:
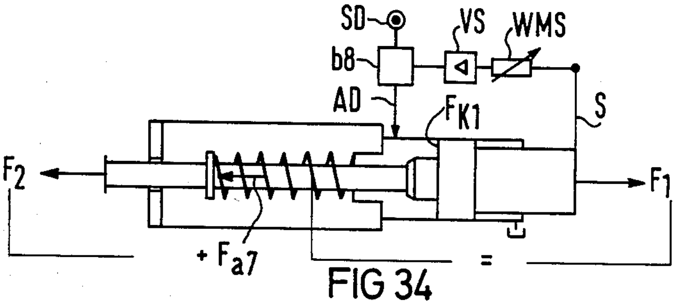
Figure 35:
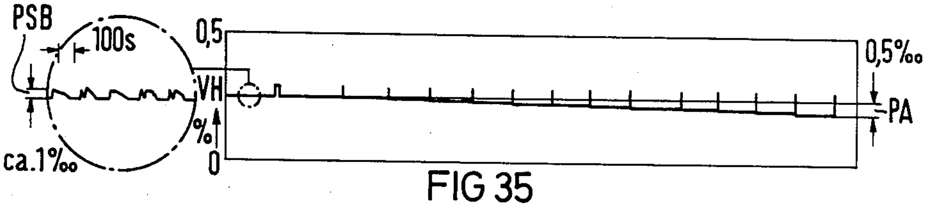
Figure 36:
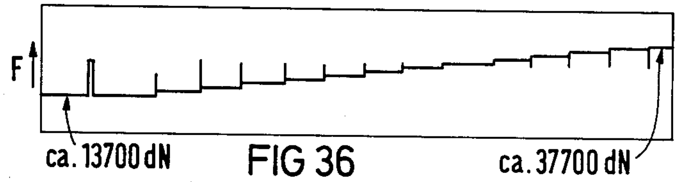
Figure 39:
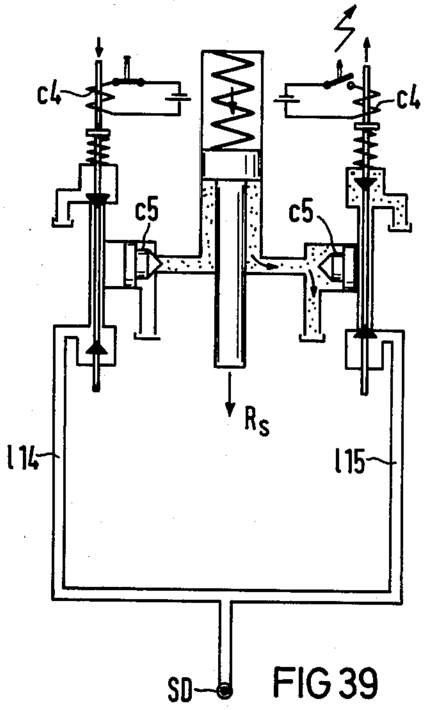
Figure 40:
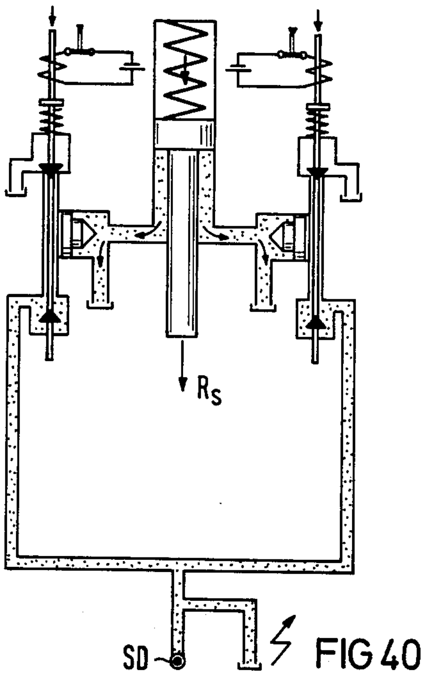
Figure 38:
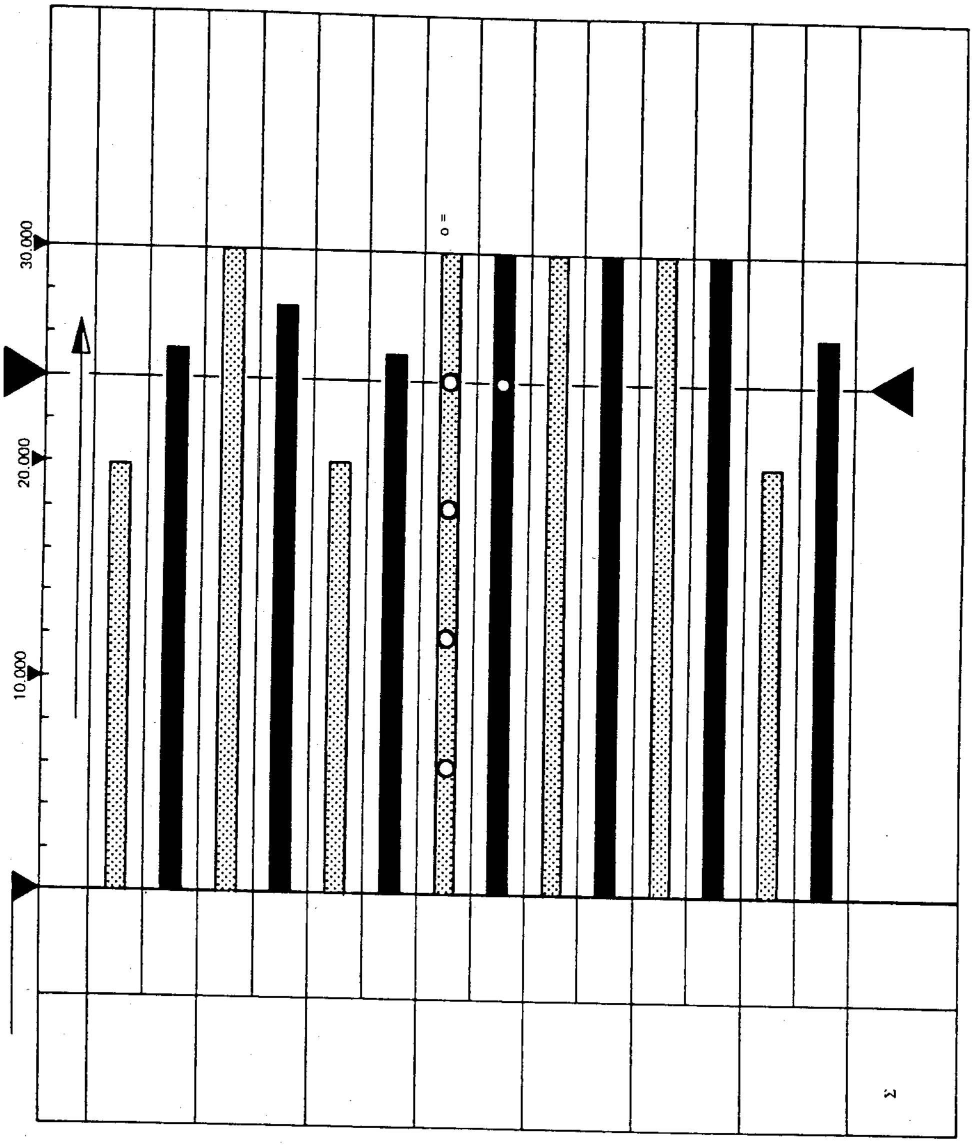

FIGS. 17, 17*a*, 17*b*, 17*c*, 18 and 19 are views of the compact drive according to FIG. 16 in a corresponding, somewhat modified presentation, wherein three different structures for leakage oil collection and monitoring points are shown in FIGS. 17*a*, 17*b* and 17*c*, and wherein FIG. 17 is a fragmentary, partly cross-sectional view, FIG. 18 is a view as seen from the right side of FIG. 17 with the hood removed, and FIG. 19 is a partially cross-sectional and partially broken-away view taken along the line XIX-XIX in FIG. 17, in the direction of the arrows;

FIGS. 20 to 25 are elevational views of compact drives assembled from different modules, in staggered sizes for main-steam, intercept or bypass valves, wherein the respective overall length and the piston diameter are written as mm-data next to each figure;

FIGS. 26 to 28 are graphical presentations of the storage capacity of a compact drive, in the form of a positioning drive, for extreme control processes, and specifically for switching-off to an internal demand (FIG. 26), for switching-off to a residual island (FIG. 27) and for short-circuit fault stepping (FIG. 28), each showing the valve stroke VH being plotted against time t;

FIGS. 29 and 30 are respective front and side elevational views of a conventional positioning drive of a 36-bar drive system showing a comparison in size to FIGS. 31 and 32 which are also respective front and side elevational views of a compact drive serving as a positioning drive;

FIG. 33 is a graph of a dynamic control characteristic of a compact drive used as a positioning drive, namely showing the curve of the actual positioning value (lower curve) as a reaction of the compact drive to certain reference value jumps of the position reference-value curve (upper part) of the diagram;

FIG. 34 is a diagrammatic view of a compact drive;

FIG. 35 is a graphical presentation of the positioning accuracy of the compact drive of FIG. 34, showing the valve stroke VH versus time;

FIG. 36 is a graphical presentation of the driving force F versus time of the compact drive of FIG. 34;

FIG. 37 is a table showing relevent output data of the motor pump unit as a function of different operating conditions;

FIG. 38 is another table including graphs showing the service life and a suitable inspection plan for the compact drive and its individual components such as the pump, working medium (pressure fluid), servo valve, etc.; and FIGS. 39 and 40 are schematic and diagrammatic views of the safety circuit of the compact valve according to the fail-safe principle, and specifically showing a circuit used in the event of a single-channel failure of the electric power in FIG. 39, and a circuit used in the event of a failure of the hydraulic energy in FIG. 40.

1. INTRODUCTION

Figure 1:
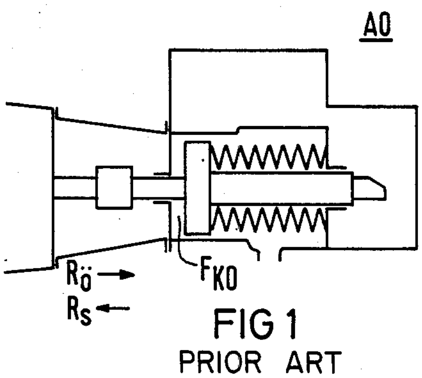
FIG 1 PRIOR ART
FIGS. 1 and 2 are similar diagrammatic views showing a comparison between a conventional drive shown in FIG. 1 and a compact drive according to the invention shown in FIG. 2.
Figure 2:
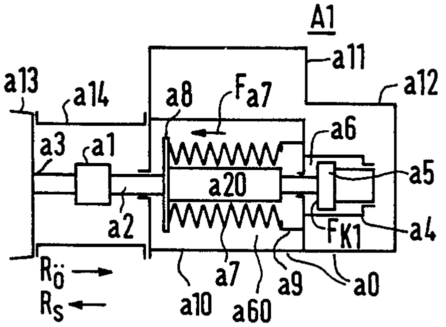

Referring now to the figures of the drawing and first particularly to FIG. 1 thereof, which shows the state of the art, there are seen control elements which will be referred to as a switching and positioning drive. Besides the purely electrical addressing, a decisive feature of the new contact drive shown in FIG. 2 is an integrated control fluid supply. This permits an increase of the number of subassemblies that can be accomodated in the drive. Due to the higher system pressure, the overall volume can nevertheless be kept small, with displacement pumps being employed. With a pressure increase of the compact drive A1 seen in FIG. 2 from the conventional 36-bar to an average system pressure of 140-bar, the positioning piston area $F_{K1}$ seen in FIG. 2, and therefore the stroke volume, is reduced to approximately 25% of that of the conventional drive AO shown in FIG. 1. The dimensions of the pump, accumulator and oil tank which are not shown in FIGS. 1 and 2, are adjusted so that a compact structure is obtained with the supply built in. In the drive AO, the positioning piston area is designated with reference symbol $F_{K0}$, where $F_{K0} \approx 4\ F_{K1}$.

The following important features of the compact drive Al itself were taken from the conventional structure of the 36-bar positioning drive A0 which has proven itself:

1.1 A direct coupling a1 of a guide rod a2 to a valve spindle a3 without intermediate levers.

1.2 A spring force $F_{a7}$ acts in a closing direction $R_S$ and thereby in the failure direction in the event of a failure of the control fluid supply. A closing or cutoff spring a7 (also referred to as an accumulator spring) is penetrated by an enlarged rod portion a20 of the piston or guide rod a2; the rod portion a20 is disposed within a hydraulic-fluid container or accumulator a10 and hydraulic fluid a60 flows around the rod portion. The container is constructed as a supporting housing.

1.3 A piston a5 supported in a hydraulic control cylinder a4 is acted upon unilaterally in the opening direction $R_o$ by pressurized oil a6; therefore, no pressure oil is consumed in a fast closing operation.

1.4 The closing spring a7 is a cup spring column with a correspondingly large inherent redundancy, which is braced with one end thereof against a support disc a8 of the guide rod a2, and with the other end thereof against a ring bracket a9 which is fixed to the housing. While the cup spring in the 36-bar drive of FIG. 1 is disposed within the control cylinder (requiring the spring diameter to be less than the piston diameter), the spring a7 in the compact drive A1 of FIG. 2 is outside the control cylinder a4 (allowing the spring diameter to be larger than the piston diameter). Other features which are diagrammatically indicated in FIG. 2 are: a drive housing a0 as a whole, a subhousing all for the hydraulic supply, a subhousing a12 for the drive control, a part of the valve housing a13 and a valve spacer a14 between the parts a10 and a13.

2. DESCRIPTION OF OPERATION

Figure 3:
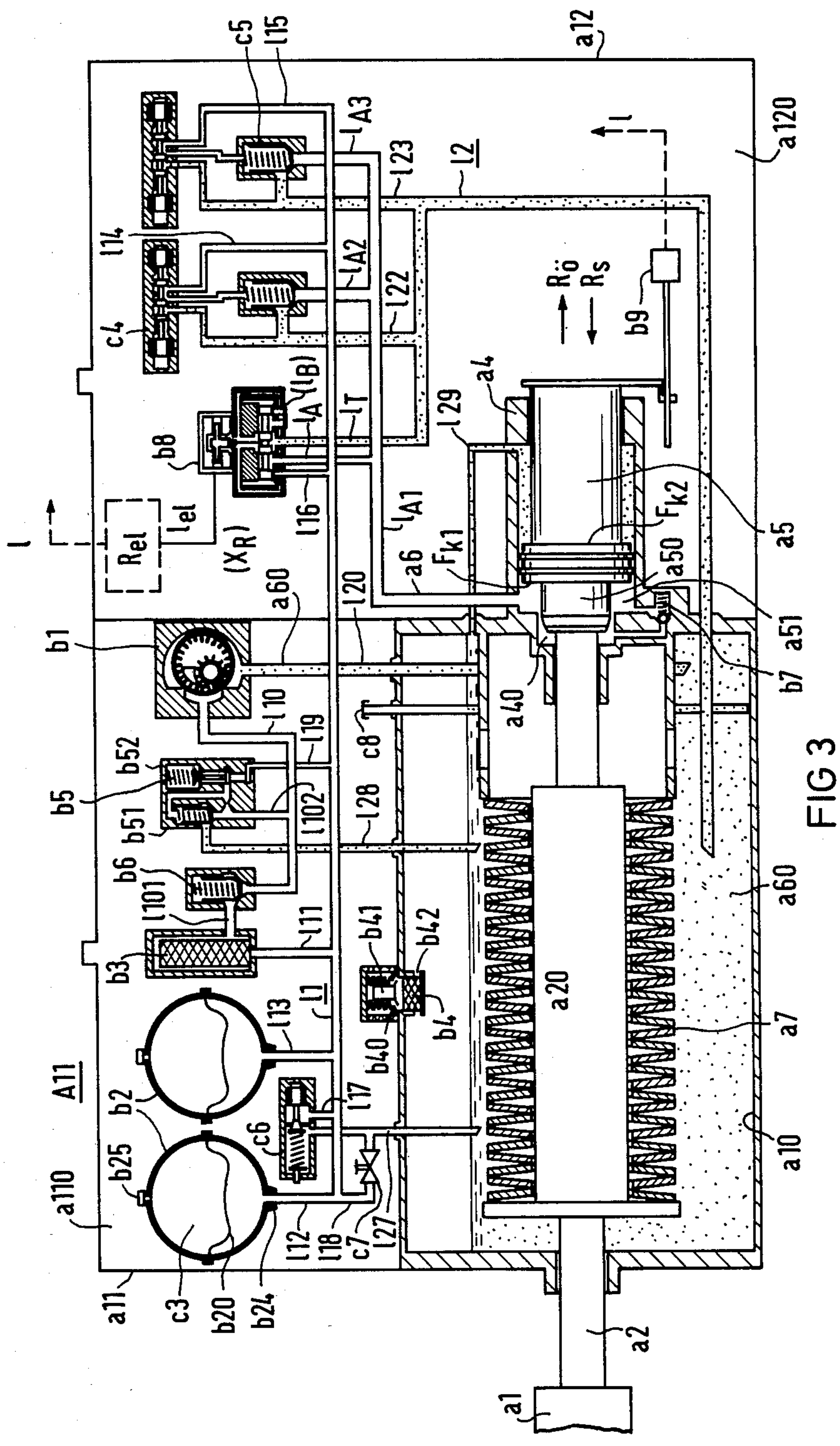
FIG. 3 is a fragmentary, partially cross-sectional view of hydraulic equipment of the compact drive which serves as a positioning drive.

The diagrammatic illustration of a compact positioning drive A11 according to FIG. 3 shows the hydraulic structure of the compact drive A11 in a preferred embodiment for control or positioning valves. The elements of the drive can be combined in four main subassemblies which are connected to each other by appropriate hydraulic lines or channels as follows:

1. the supporting housing a10 which simultaneously forms the oil tank (when an oil tank is mentioned below, this term includes a hydraulic liquid tank which may be filled, for instance, with SBF, a non-inflammable liquid);

2. the control fluid supply, including, inter alia, a pump b1, an accumulator b2, a filter b3, etc., disposed in a supply space a110 of the subhousing a11; the control fluid (pressurized oil) being generally designated with reference symbol a60 and shown as dots on the discharge side (suction side of the pump b1) as compared to the control fluid a6 on the output side of the pump b1;

3. the positioning cylinder a4; and 4. the control for the positioning cylinder a4, disposed in a control space a120 of the subhousing a12.

5. It is noted that a corresponding subdivision of four subassemblies applies to the switching drive A12 shown in FIG. 15.

6. Furthermore, reference is to be made to the hydraulic lines or channels of the two drives A11, A12.

2.1 The oil tank simultaneously serves as the installation space for the closing spring a7 which is guided on the piston rod a1, a20. The tank a10 is connected through a double valve b4 to the supply space a110 for pressure equalization. Pressure changes due to temperature and level changes in the oil tank a10 are equalized by respective overpressure and underpressure subvalves b40, b41. In the case of underpressure, the air which flows in is filtered by a filter b42. The two subvalves b40 and b41 are disposed approximately concentrically with spring-loaded closing pieces and valve seats.

2.2 The control fluid supply is constructed for intermittent operation to protect the pump b1 and to save energy. In other words, with increasing pressure, the accumulators b2 are filled with the excess pump flow over the consumer leakage flow in a charging operation. With an overflow valve b5 closed, the pump current flows through the check valve b6 of the filter b3 to the accumulator b2. After an upper charging pressure is reached, the overflow valve b5 opens and the check valve b6 closes so that the pump b1 pumps back into the tank a10, i.e., in a discharge operation with circulation occuring almost without pressure. The leakage flow and possibly the stroke volume is taken from the accumulators in this case.

FIGS. 6 to 10 along with FIG. 3, show the pressure-vs-time behavior of the charging cycle. With a prefilling pressure $p_v$ of the accumulator gas, filling at 90-bar, the upper charging pressure $p_{max}$ is about 160-bar and the lower charging pressure $p_m$ is approximately 140-bar, while the first usable accumulator volume is $\Delta V_L$. The charging time $\Delta t_l$ is about 20 s, and the discharging time $\Delta t_{el}$ is about 2 min, if only the leakage current flows off, as seen in FIG. 8. FIG. 9 shows the valve stroke vs time for the two extreme control processes c1, c2. The pressure range from the lower charging pressure of 140 bar, to the minimum operating pressure $p_{min}$ of 110-bar with the second usable accumulator volume $\Delta V_R$ is provided for control processes, as seen in FIG. 10.

2.2.1 ACCUMULATORS

As shown in FIGS. 6 and 7, diaphragm accumulators b2 are used, in which the separating member between the control fluid a60 or a6 and a gas c3 is in the form of a clamped diaphragm b20. In the operating cycle, the diaphragm b20 rolls of the wall without rubbing in the device of FIG. 7, so that abrasion entering into the filtered liquid is avoided. The accumulators b2 each are formed of a cup part b21 with a cover part b22, which are clamped together and to the rim of the bell-shaped diaphragm b20, forming a seal in vicinity of parting gaps b23. The cup part b21 of each accumulator has a hole b24 formed in the bottom thereof for connecting lines 112, 113 for the control fluid a6 seen in FIG. 2 and the cover part b22 has a closable filling opening b25 formed in the top thereof for pressurized gas, such as nitrogen. In FIG. 6, the gas charge c3 fills the entire accumulator volume. The gas charge c3 is at the prefilling pressure $p_v$ of the accumulator shown in FIG. 8; according to FIG. 7, the gas charge c3 is compressed so far that it is at equilibrium with the prevailing pressure $p_{min}$, $p_m$, $p_{max}$ of the control fluid.

2.2.2 CONTROL LIQUID PUMP b1

Figure 11:
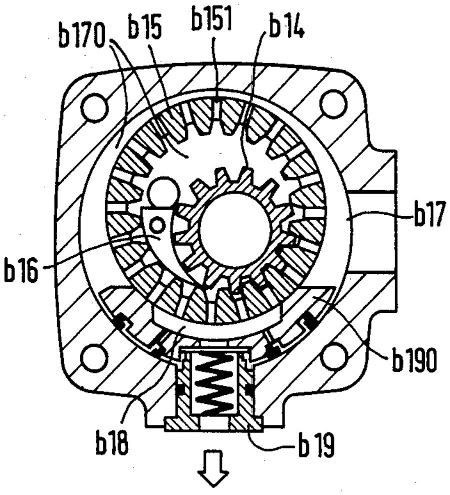
FIGS. 11 and 12 are cross-sectional and longitudinal-sectional views of an internal-gear pump which is preferably used for the hydraulic supply system.
Figure 12:
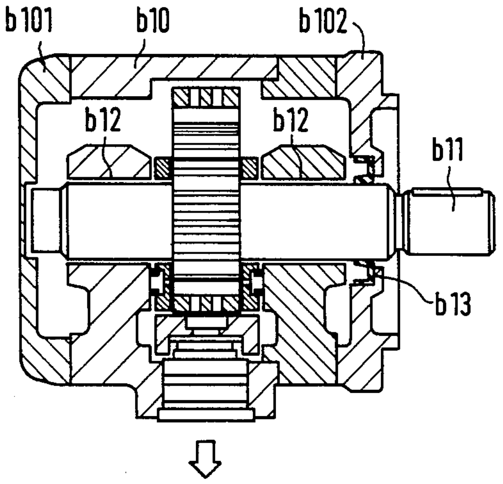

FIGS. 2, 11 and 12 show that a rotary piston pump in the form of an internal gear pump was chosen as the control fluid pump, because it has the following advantages over other high-pressure pumps:

little noise development and quiet running;

support of a pinion shaft b11 in sliding bearings b12, and no need for antifriction bearings; and little wear and therefore the expectation of a long service life (minimum of 25,000 hrs.). In detail, reference symbol b10 refers to the housing enclosure with bells b101, b102; b13 refers to a shaft seal; b14 is a pinion; b15 is an internal gear with control holes b151; b16 refers to a control wedge; b17 is a suction canal with a suction space b170; and b18 refers to a pressure space with a connected output stub b19 and a sealing insert b190. Preferably, a second pump with a motor is built-in next to the working pump as a standby system, in order to double the service life of the drive with respect to the period during which the pump can be used without replacement. The electric drive is interchangeable in situ.

2.2.3 FILTER b3 AND FILLING AND DRAINING STUB c8

The draining stub c8 shown in FIG. 3 serves for filling the oil tank a10 with control liquid a60 and for draining the liquid from the tank. Continuous filtering in the main flow by means of filters b3, permits the entire hydraulic system shown in FIG. 3 to be kept at a high degree of purity.

2.2.4 A safety valve c6 protects the accumulators b2 from overpressure; the safety valve c6 is tripped when a fixed, settable pressure limit is reached; a relief valve c7 serves for relieving the accumulator b2 and a pressure manifold 11 of pressure for inspection work or the like.

2.3 Control Cylinder

As seen in FIG. 3, pressure acts on the control piston a5 in the opening direction $R_o$, and is relieved on the side $F_{K2}$ opposite the piston pressure side $F_{K1}$. The closing force is supplied by the cup spring column a7. A braking piston a50 is immersed in a damping space a40 for braking from a high control speed during closing. The residual speed can be changed by an adjustable choke, which is not specifically shown. In order to open after a fast closing operation, a check valve b7 opens the damping space a40 to a cylinder pressure space a51, which is then pressure-relieved.

Figure 13:
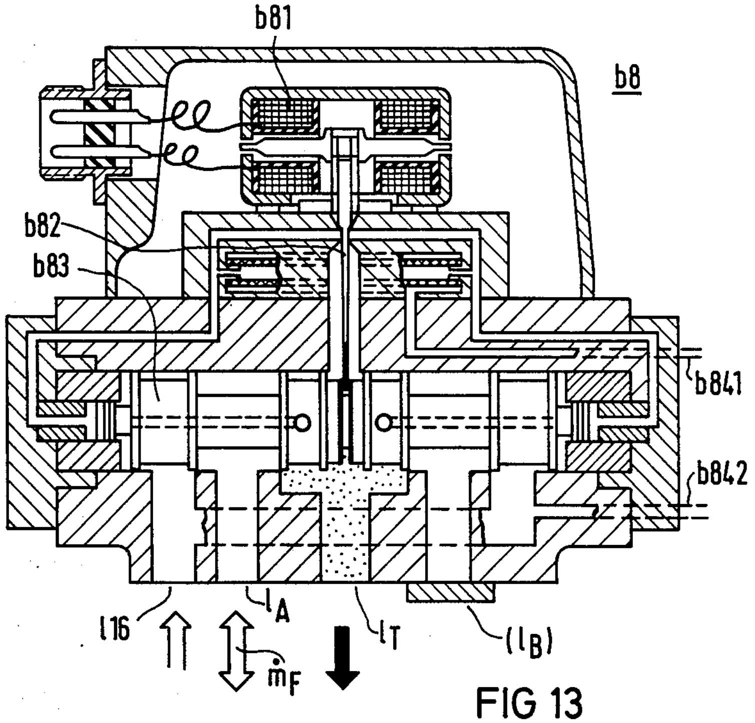
FIG. 13 is a partially cross-sectional view of an electrohydraulic servo valve which is used in the driving system according to FIG. 3.
Figure 14:
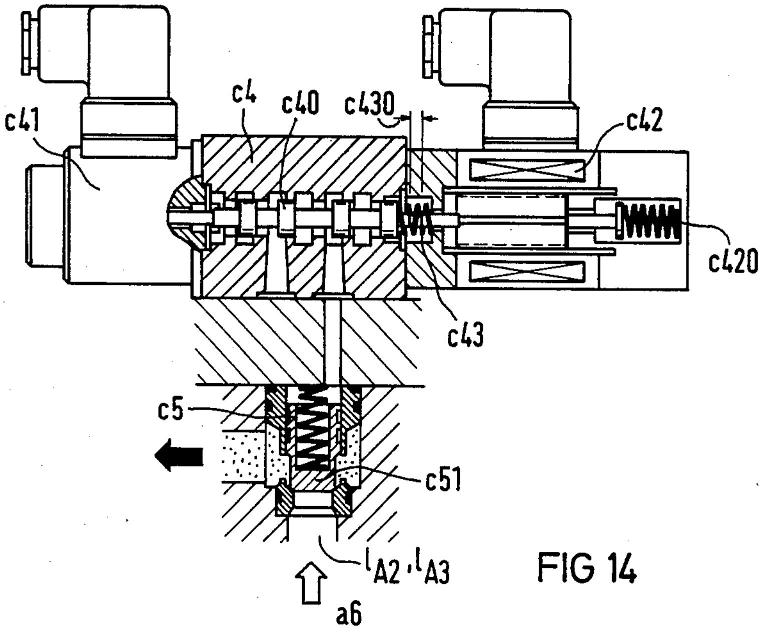
FIG. 14 is a partially cross-sectional view of a seat valve combined with a path valve with an impact magnet, which is a further essential component of the drive system according to FIG. 3 or according to FIG. 15 to be described below.

2.4 Control (FIGS. 3, 13 and 14)

2.4.1 Electrohydraulic Servo Valve b8 (FIGS. 3 and 13)

The electrohydraulic servo valve has an electric positioning motor designated with reference numeral b81, including a baffle system b82 and a control slider b83. A valve positioning motion is initiated by a control deviation $X_R$ between a desired position value $X_{soll}$ and an actual position value $X_{ist}$. The control deviation is impressed on the electrohydraulic converter or servo valve b8 by a position control $R_{el}$ as a low-power (less than 1 watt) electric current. The converter or electrohydraulic servo valve, is in the form of a high-quality, continuously acting bidirectional control valve with particularly good stationary and dynamic properties and large power gain (more than $10^6$). After a few msec, a proportional oil flow is assigned to the electric input current as the output variable. As a rule this is accomplished by two amplifier devices hydraulically acting in tandem; in the figures, this is represented by a baffle system b82 with slider control. The hydraulic connections are designated with reference numerals 116 (connection to the oil pressure manifold 11), $\mathbf{1}_T$ (connection to a discharge manifold 12) and $\mathbf{1}_A$ (control oil outlet). Element ($\mathbf{1}_B$) is a B-connection for bilateral action, in the form of a blind flange. The distance which has been travelled is acknowledged to the electric position control $R_{el}$ through a distance measuring transducer b9 which preferably operates according to the ultrasound principle, so that the position control circuit is closed (as indicated by the broken feedback line $l_{rück}$). Element $\mathbf{1}_{el}$ symbolizes signal lines for the electric output variables $X_R$ of the control $R_{el}$ leading to the electric positioning motor b81. Elements b841 and b842 are feed and return lines for a non-illustrated fluid filter. An electrohydraulic service valve of basically the same construction as shown in FIGS. 3 and 13, is a standard component and is described, for instance, in Catalog 730 of the firm MOOG GmbH located in D-7030 Böblingen, Germany, entitled "Durchfluss-Servoventile Baureihe 73" (Servo flow valves Design Series 73), published in May 1975 (6 pages), and in particular in the three figures on page 2 thereof. The switching symbol shown therein and a brief description of the operation thereof has also been incorporated into the publication "ISO Standard 1219" of the "International Organization for Standardization" entitled "Fluid power systems and components - Graphic Symbols", Ref No. ISO 1219—1976 (E/F). The switching symbol is depicted therein on page 10 under No. 7.2.4 An even more detailed explanation of the electrohydraulic servo valve can be dispensed with within the scope of the instant application.

2.4.2. Two-Way Seat Valve with Drive (FIG. 3, FIG. 14)

The seat valves are in the form of electromagnetically operated path valves or path sliders c4 for driving cartridge-type seat valves c5 hydraulically connected thereto or structurally combined therewith. In order to provide fast shutting-off processes due to a large amount of load-shedding or a fast shut-off release, two of the two-way seat valves c5, driven by magnetic valves, are opened with the shortest possible operating time and the piston space a51 is connected to the discharge. Due to the short channels from the cylinder a4 through the path valves c4 to the oil tank a10 and to possible ample dimensions of the path seat valves c5, short shutting-off times of less than 150 msec and short delay times, can be obtained. The two-way seat valves c5 are standard components with piston guidance, which are kept closed if servo cylinder pressurized oil a6 is provided under a valve cone c51 by the control pressure formed by the magnetic path valve c4 above the cone, as seen in FIG. 14. In the event of a fast shut-off, an energized magnet c41 carries no current and the control pressure is therefore lowered; the path valve c4 opens. The tripping process is aided by a second magnet c42 at the path valve c4, the armature c43 of which causes a breaking-away pulse through a spring c420 and thereby brings about a reliable response from the rest position, even after an extended operating period. The armature c43 hits the end surface of the control slider c40 as an impact armature after traversing the distance c430.

Figure 15:
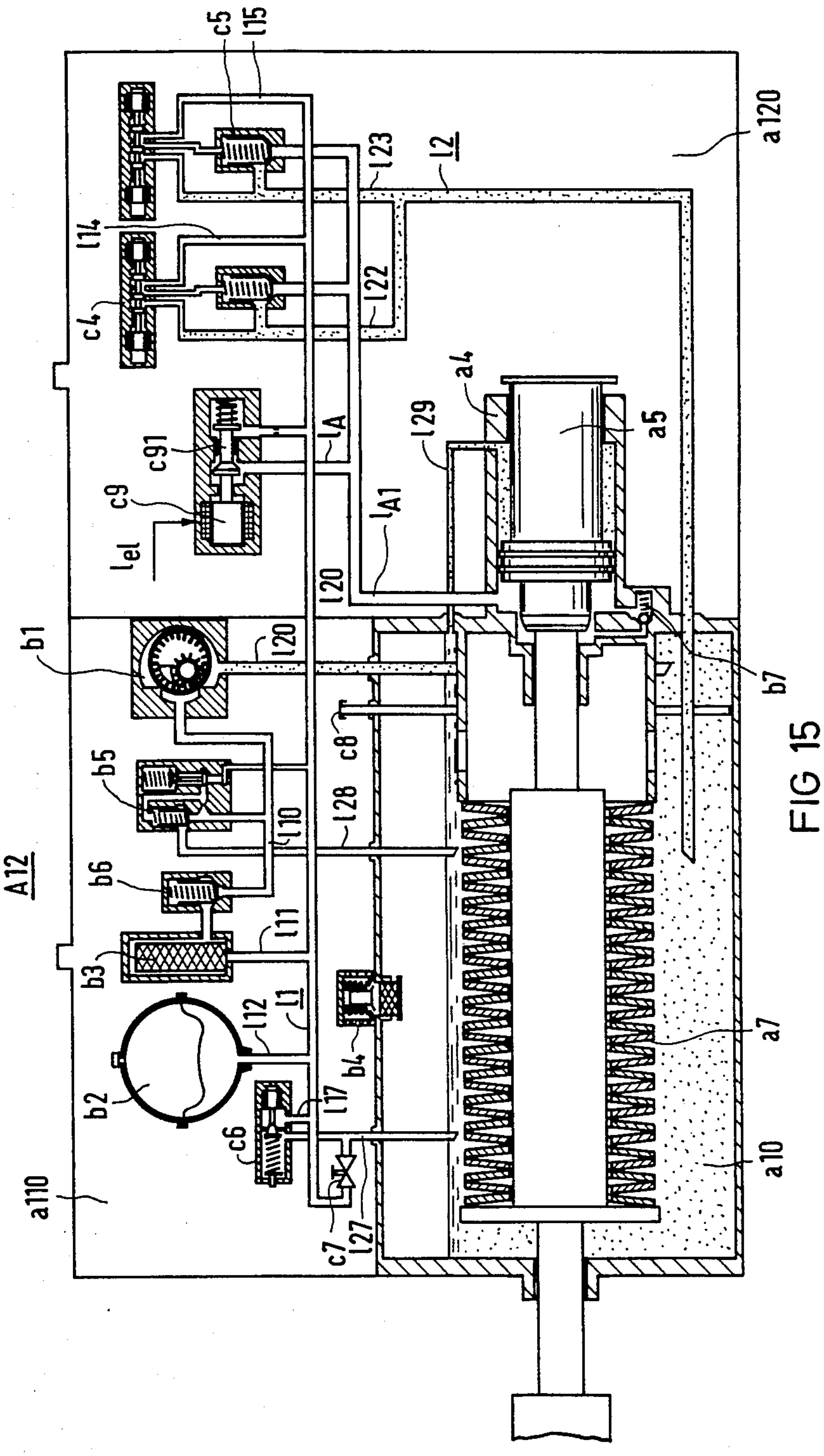
FIG. 15 is a view similar to FIG. 3 of hydraulic equipment for a compact drive constructed as a control drive.

2.5 Switch Drive (FIG. 15)

The switch drive serves for actuating fast shut-off valves. Parts which are identical with those in FIG. 3 carry the same reference symbols. The switch drive A12, i.e., its electrohydraulic control valve c9, is addressed by binary electrical signals over the signal lines $\mathbf{1}_{el}$, so that in the state of rest, a control slider c91 occupies only the closed or open position. By addressing through path or seat servo valves c5, short delay and closing times of less than 150 msec are obtained, as with the control or compact positioning drive A11, so that both drives can be constructed the same, with the exception of the following deviations:

Instead of the electrohydraulic servo valve b8, the control valve c9 (magnetic valve) is built-in, and releases the oil flow to the cylinder for opening the steam valve, which is not shown in detail, as in FIG. 3.

Since the leakage flow of the control valve c9 is less than that of the servo valve b8 at the control drive A11 and since furthermore, no pressure fluid for fast control processes need be provided, the number of accumulators can be smaller and a smaller pump b1 can be used.

The distance measuring transducer b9 is eliminated.

2.6 HYDRAULIC LINES OR CHANNELS (FIG. 3, FIG. 15)

A pressure line 110 is connected to the output side of the pump b1, and leads through the check valve b6, the short line section 1101, the filter b3 and the line section 111 into the pressurized oil of the pressure fluid manifold 11. The following items are connected to the line section 111 by spur lines:

The accumulators b2 lead to the line section 111 through the lines 112 and 113, the safty valve c6 leads through the line 117 and the relief valve c7 leads through the line 118. A discharge line 127 of the valve c7 leads into the oil tank or container a10.

The overflow and accumulator charging valve b5 leads to the line section 111 through the control pressure line 119, whereas the line section 1102 is connected to the pressure line 110 and, when reaching the upper accumulator charging pressure $P_{max}$, the line section 1102 forms a bypass to the tank a10 through the opening overflow valve b5 and the discharge line 128, so that the pump b1 pumps in the circulating mode and no longer into the accumulators b2 (discharging operation). A pump intake line 120 which is immersed with its lower end in the hydraulic fluid reservoir of the tank or oil container a10, is connected to the intake side of the pump b1. Leading into the reservoir filled with the control fluid a60 are also the filling and drainage stub c8, a cylinder discharge line 129 and the discharge manifold 12 from the servo valve b8, the path sliders c4 as well as the seat valves c5. The discharge connecting lines from the valves b8, c4 and c5 which are connected to the manifold 12, are designated with reference symbols $l_T$, 122 and 123, respectively. The servo valve b8, which is connected to the pressure fluid manifold 11 through the line section 116, passes a fluid flow of greater or lesser magnitude which is analogous to the electric current signal $X_R$, to the line $1_A$ as the piston pressure fluid, and from there through to line $1_{A1}$, through which pressure is admitted to the piston pressure si $F_{K1}$.

3. MECHANICAL DRIVE STRUCTURE 3.1 CONSTRUCTION (FIG. 16, FIG. 18)

FIG. 16 shows a cross section through a positioning drive suitable for a main steam valve. The cup-shaped housing a10 represents a welded structure and is fastened, as is conventional, to the valve housing a13 by a column or valve spur a14. The central interior a100 of the housing a10 is closed off by a cover d1 and simultaneously serves as the oil container. The oil container is traversed by the piston rod, on which the cup spring column a7 is guided by bushings d2.

A cylinder block d3 is bolted to the cover d1 and contains all of the control components such as the servo valve b8 and the control valve c9 (shown in FIG. 18), the seat valve c5 with the pilot control path valves c4, a venting valve b400, the distance measuring transducer b9 and non-illustrated binary position pickups, for indicating the extreme positions "open" and "closed", for instance, for the automatic testing device. These are protected by a removable hood d4 which defines the control space a120. The valve b400 serves for venting the pressure manifold when the operation is started and the valve b400 is mounted, as far as possible, at the geodetically highest point of the compact drive.

The jacket or shell part of the housing a10 represents the supply space a110 and the installation openings thereof are closed off by covers d5. All of the components of the control liquid supply are disposed therein: pumps b1, accumulators b2, filters b3, overflow valve b5 (not visible), check valves b7, pressure measuring transducers b500, etc. Electric motors b10 are connected to the end wall of the housing a103 on the outside by flanges. The electric motors b10, together with a shaft 110 and a coupling 120, pass through a hole a104 formed in the end wall, and drive the pumps b1 disposed in the supply space 3.2 STRUCTURAL MEASURES FOR PREVENTING THE EMERGENCE OF LEAKAGE OIL (FIGS. 17, 18 and 19)

3.2.1 The housing a10 transmits the valve forces to the servo or hydraulic control cylinder a4 and is therefore constructed with accordingly large wall thicknesses, as may be seen. This also results in an overdimensioning of the container wall for the approximately pressureless oil space a100 and therefore provides maximum safety against external damage.

3.2.2 All of the components under the pressure of the pressurized oil 16 are sealed by non-illustrated O-rings and, as a rule, are provided with pressure relief against the mounting surfaces of the housing a10 and the cylinder a4. The connections carrying pressurized oil are drilled as canals d6 in the housing a10, cover d1 and cylinder a4, with the exception of the pump output lines 110. The return oil is likewise conducted through canals d61 into the oil space a100, so that leakage oil does not escape at any location into the supply or control space a110 or a120, respectively.

3.2.3 Should splash or leakage oil accumulate in case of trouble, it cannot escape from the drive since all pressure-carrying components are located within the spaces which are vented to the outside by splash-protected openings d7.

3.2.4 Leakage and splash oil accumulates, for instance, if the drive is disposed horizontally (in the position L1 shown in FIG. 17*a*), at the bottom of the hood d4 of the control space a120, as indicated by broken lines at d81; this is indicated by a level monitor and is also visually displayed by a viewing glass. Smaller amounts of leakage oil can also accumulate in the crease d81 of the hood enclosure. As usual, the non-illustrated electric level monitor indicates at least one lower level and one upper limiting level. For the upright position L2 shown in FIG. 17*b* and the suspended installed position L3 of the compact drive A1, A11 or A12, as shown in FIG. 17*c* further leakage oil collecting points are shown at reference symbols d8s and d8h. The positions L1, L2 and L3 are shown diagrammatically by means of the piston rod axis aa and its coupling a1.

3.2.5 The seals d9 of the cylinder pressure space a51 at the piston rod a2 and at the piston a5 are in communication with the oil tank a10 or its interior a100 on the pressureless side, so that leakage oil flows off directly into the container a10.

3.2.6 The piston rod a2 which is brought to the outer left side through the seals d9 and which is made with a high-quality surface, is protected against contamination by a hood e1, so that the condition of the surface is preserved and the seal d9 remains intact. The combined set of seals d9 is formed of one wiper ring, two guide rings and two seal rings (not designated in detail).

3.3 COOLING (FIGS. 16, 18)

3.3.1 The hydraulic control fluid a60 is cooled predominantly by natural heat exchange of the oil content through the container wall a101. Depending on the permissible heating-up temperature of the pressurized fluid and on the load, in some circumstances it may be possible to do without a separate cooling medium, or without a heat exchanger. The natural cooling is assured by the large cooling area of the housing wall with cooling fins a102 as well as by a low number of revolutions per minute.

3.3.2 For the electrical equipment disposed in the control space a120, a maximum operating temperature of 60° C. is permissible. The heat produced by the continuously energized magnetic valves b8, c4 and c9, respectively, (see FIG. 18) (closed-circuit principle) must be removed. To this end, a cooling flow generated by a radial blower e2 is guided around the splash-protection hood d4. The splash protecting venting openings d7 in the cover d5 of the supply space a110 provided with air filters, assure venting of this space which is in communication with the control space 120 by connecting canals e4 (indicated by broken lines), so that depending on the position of use L1, L2 or L3 (see section 3.2.4), possible leakage oil can flow off to the leakage oil collecting point in the control space a120 (in the supply space a110) from the supply space all (or from the control space a120). The cooiling air leaving a blower hood e3 flows in part through the flange holes e5 along the housing a10 and provides additional oil cooling.

3.4 OTHER FEATURES (FIGS. 16, 17, 18, 19)

Reference symbol e7 in FIG. 19 refers to a filling and draining stub for pressure fluid; reference numeral e71 is an associated line which ends with a mouthpiece e72 at the lowest point of the container; reference numeral e73 likewise refers to pump intake lines opening into the fluid space a100 in a disposition for the horizontal position L1 of the drive as shown. Reference numeral e8 in FIG. 16 refers to a pressure fluid return line which comes from the overflow valve b5 (see FIGS. 3 and 15) into the fluid space a100. Reference symbol e6 designates a plug box which is mounted at the container or the housing a10 and will be explained in further detail below (FIGS. 18 and 19). Connecting stubs and holes e9 which are provided at the bottom on both ends of the container a10 and are covered up by covers, serve as a non-illustrated pressure fluid connection of a regeneration loop which has Fuller's earth and mechanical filters as the filters in case SBF liquids (liquids that are difficult to ignite), such as phosphate esters, are used.

The envelope of the container a10 has a tunnel-like cross section with an arched part a105 which has the cooling fins a102 and a reinforced planar base a106 which forms a planar mounting surface for hydraulic elements of the supply space a110. The line e73 in FIG. 8 corresponds to reference symbol 120 in FIG. 3 and FIG. 15; reference symbol e8 corresponds to reference symbol 128.

4. PRODUCTION SERIES (FIGS. 20 to 25)

A production series has been developed for all of the main steam, intercept and and bypass valves, which is graduated according to nominal valve clearances and steam pressure ranges. The illustration shows the size comparison of the drives for main steam and intercept valves FV and AV, which are also used as variants of bypass valves UV.

Depending on the valve arrangement, all installation positions are possible: horizontal, hanging vertically and standing up.

Compact drives according to the invention are likewise suitable for driving rotary dampers as control and fast-acting shutoff dampers for removing heat as well as for intercept, fast-acting shutoff and control dampers. These are supported in pivots and they transmit the positioning force to the damper as a torque through a nonillustrated crank drive.

The halves of the shaft sealing steam control are also preferably operated by electrohydraulic drives (if short positioning times are required), which are likewise electrically addressed and have an internal oil supply.

5. STORAGE CAPACITY OF THE POSITIONING DRIVE FOR EXTREME CONTROL PROCESSES (FIGS. 26 to 28)

Due to the unilateral admission of pressure, the necessary stroke volume is only taken from the accumulators b2 in the case of control movements in the opening direction. In normal control processes for speed and power control, the oil consumption is small and a large storage capacity is only necessary for leveling-out extreme disturbance cases.

The following disturbances are assumed, when initiated by a fast shut-off motion:

disconnecting the load to internal requirements (FIG. 26)

shutting off to a residual island (FIG. 27)

short-curcuit fault stepping (FIG. 28)

For leveling-out these disturbances, i.e., for opening the valve with subsequent transients with damping, working volumes are obtained which correspond to the stroke movements and which must be covered by the usable accumulator volume. The accumulator capacity is adjusted for these disturbance cases.

6. SIZE COMPARISON OF THE COMPACT DRIVE WITH A 36-BAR CONTROL DRIVE (FIGS. 29 to 32)

A 36-bar control drive A01 (FIGS. 29 and 30) is compared with a compact drive A11 (FIGS. 31 and 32) of the same control performance, suitable for a main steam control valve, and having a nominal size 200. The overall length of the compact drive A11 is slightly larger.

7. DYNAMIC BEHAVIOR (FIG. 33)

On the basis of experience with present-day installations and on the basis of analog computer studies which have been performed, a positioning time of 1.5 sec was determined for control motions and a positioning time of 150 ms was determined for the shutoff motion. The valve stroke VH is again plotted on the ordinate axis.

FIG. 33 shows the curve of the distance-time behavior measured on the experimental unit.

After a jump of the desired value from 0 to 20% of the maximum stroke, jumps of 10% are made.

From this position, a jump of the desired value to 100% is made and subsequently, a fast shutoff motion corresponding to switching off under full load or fast-acting shutoff tripping is carried out. The short delay time $t_{vz}$ of 70 ms should be noted. The comparable delay time in the conventional 36-bar system (including electrohydraulic transducers in this case) is 140 ms.

The servo valve b8 and the seat valve c5 have no positive covering for their control edges, so that the hydraulics respond gently without jerking. The substantially better dynamic properties of the compact drive as compared to present-day drives are seen in the very short delay time of the electrohydraulic components and in the superiority of acceleration.

8. POSITION ACCURACY (FIGS. 34 to 36)

The enlarged portion of FIG. 35 shows a magnified presentation of a position spread PSB of the 50%-actual position value over a time of about 15 min. The position spread is referred to the maximum stroke (100%)=180 mm and is about 0.1% or 0.18 mm. As compared to conventional present-day drives, this result is an improvement by about 10 times. Reference numeral PA refers to the position deviation due to the driving force.

The positioning force in this case is about 42,000 dN (decanewtons). The relationship between the tension (load) $F_2$, the restoring force $F_{a7}$ and the driving force $F_1$, can be expressed as $F_1=F_2+F_{a7}$ (see FIG. 34). The high pressure amplification of the servo valve b8 and the small enclosed volume of liquid due to the compact structure are decisive for the high stiffness of the system. The meanings of the further designations in FIG. 34 are: SD=system pressure; VS=amplifier; WMS=distance measuring system; AD=working pressure; and $F_{k1}$=piston working area or positioning piston area.

In an experimental setup, the pulling force ($F_2$) was increased in steps of 13,700 dN to about 37,700 dN. The constant set value $S_{const}$ was 50%. The largest position deviation was 0.05% (about 0.1 mm). The comparable value of a present-day device is approximately 0.8%.

9. PERFORMANCE DATA OF THE COMPACT DRIVE (FIG. 37)

The applications of the compact drive A1, A11, A12 (little power demanded for positioning probelms and a great deal of power demanded for control motion) are consistent with the principle of hydraulic accumulator operation.

The power data for various operating requirements are given in the Table.

The designated power rating of the pump b1 and the motor b10 is relatively small as compared to the high power consumption for control and fast shut-off motions.

The power delivered continuously by the compact drive as the product of the output of the pump times the circulation pressure, and the leakage oil flow times the system pressure, is maximally 20% of the designated power rating.

10. OPERATING TIMES BETWEEN INSPECTIONS OF CERTAIN COMPONENTS AND INSPECTION PLANNING (FIG. 38)

The compact drive employs certain components which are not provided in conventional drives. However, only matured and proven hydraulic components are used, so that estimates of service life and inspection plans can be made.

Starting from the general industrial application of these components, measures for prolonging the service life were taken into consideration during the conception of the compact drive.

Lower utilization (power reserves are present because the maximum pressure in the compat drive is far below the permissible pressure);

a high degree of purity of the operating medium and the compact drive (inspection is carried out accompanying production);

special quality assurance;

protection from environmental influences (encapsulation of the compact drive);

taking the experience from conventional drives and similar installations into consideration.

The influence of these measures on the most important components will be explained in relation to FIG. 38. Inspection intervals of at least 24,000 hours are assumed. With an average in-service time of 6,000 hours per year, an overhaul period of 4 years is obtained.

11. RELIABILITY AND SAFETY OF THE COMPACT DRIVE

The compact drive is reliable and safe due to the special mechanical structure, having the following features:

Modular construction;

freedom from stress of the connection of individual components;

large support spans;

matured components from industrial hydraulics;

closed hydraulic system with a high degree of purity and continuous filtering;

special surface quality for sealing and guiding surfaces;

reserve power of the components; and further due to

Tests performed on the compact drive:

tests with an overload, such as an increase of the load cycle up to the response pressure of the safety valves;

life expectancy tests (time-dependent influences of temperature, operating medium and hydromechanical stresses);

operating experience with electrohydraulic servo valves of the installation in the Mhrum Power Station, and by a Safety Circuit at the Compact Drive (Fail-Safe Principle), FIGS. 39 and 40:

Through application of the fail-safe principle, safety-directed actions are released in the compact drive. In the operating positions, lifting magnets of the path valves c4 are switched against restoring springs according to the closed-circuit principle. This means that in the event of a failure of the electric power supply, the spring forces are available for safety-directed actions (pressure reduction in the working cylinder), as is shown in FIG. 39 for a one-time failure of the electric power. FIG. 40 shows the fail-safe behavior in the event of a failure of the hydraulic energy. The medium, which is at the run-off pressure level, is again shown by dots.

12. NOTES REGARDING INSTALLATION AND START-UP

The compact drives are furnished f.o.b. as a "complete system". After leaving the test floor, the working medium remains in the compact drive. The positioning stroke is preset. The hydraulic system is permanently set to the required pressure level, so that time-consuming adjustment work is no longer necessary at the construction site.

The absence of any connecting piping makes the drives installation friendly and service friendly, meaning that they are easy to install and service. The required installation is limited to connecting to the valve with flanges and connecting the coupling halves.

The electric power supply and the signal transmission are accomplished through a flexible cable with plug connectors.

In order to connect diagnostic equipment, an additional plug outlet is provided in the connector housing e6 fastened at the housing a10 of the drive, which is located and covered up behind the outlet e61 seen in FIG. 19. The operating pressure, operating temperature and other parameters can be interrogated at the outlet. These parameters are furnished by transmitters installed within the compact drive as electrical analog variables. The transmitters are not shown. Adjustment work for starting up can be performed by means of an ambulatory electrical controller. This controller can be appropriately connected to the outlet e61 through connectors e62 and signal and power supply cables e63. The controller is not shown since it may be formed of elements which are available in the prior art. The wall e64 of the connector housing e6 is easily detachable, such as by swinging it away, for access to the connectors.

The structure and operation of the overflow valve b5 are explained in greater detail below with respect to FIGS. 2 and 15 as well as FIGS. 4 and 5. The overflow valve b5, which is connected to the pressure side of the pump b1 through the line 110 and the line section a102, serves as an accumulator charging valve. The valve b5 is formed of a two-way seat valve b51 and a servo valve b52, which are accomodated in a common housing, i.e., they may be combined with each other structurally. The two-way seat valve b51 is also referred to as a cartridge valve. The overflow valve b5 with its two valve sections b51, b52 is basically controlled by the accumulator, pump and run-off pressure prevailing in the line sections 119, 1102, 128 in such a manner that its two-way seat valve b51 connects the pressure (output) side of the pump b1 to the run-off or the fluid reservoir of the fluid container a10 if the upper charging pressure $P_{max}$ of the accumulators b2 is reached during the charging operation. In this case the check valve b6 following the overflow valve b5 on the pressure side is closed. Conversely, the two-way seat valve b51 shuts off the feed cross section of the run-off line 128, opening the check valve b6, and thereby releases the output line 110 of the pump b1 to the accumulators b2 if, in the discharging operation of the accumulators b2, the accumulator charging pressure has dropped to the lower charging pressure $p_m$. Speaking generally, the overflow valve b5 therefore comprises a two-way seat valve b51 with an "open", "closed" and pressure valve function with a preceding pressure-dependent servo stage b52. In the embodiments according to FIGS. 3 to 5 as well as FIG. 15, the servo stage b52 is constructed as a servo valve, and specifically with a seat valve of special construction loaded by a restoring spring.

Figure 4:
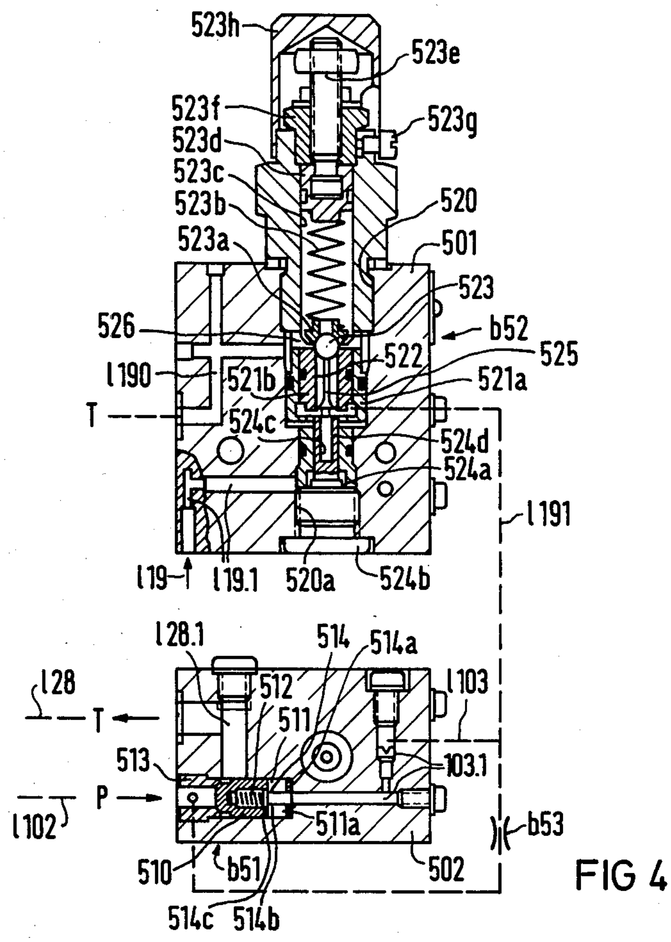
FIG. 4 is a detailed cross-sectional view of the overflow valve shown in FIG. 3.

Regarding this feature, reference is made in detail to FIGS. 4 and 5.

The servo valve b52 is in the form of a pressure-dependent, hydraulic, individual resistance with a holding function in the pressure interval between $P_{max}$ and $p_m$ (normal case) which switches over if $p \leqq p_m$, i.e., even if the accumulator charging pressure drops to pressure values below $p_m$ and down to $P_{min}$ in the case of extreme control processes. An external bushing 521*a* is inserted and sealed at its outer periphery by means of O-rings in a hole 520 formed in a housing part 501 of the overflow valve b5. An inner bushing 521*b* is inserted and sealed by means of O-rings or the like at its outer periphery in the external bushing 521*a*. The inner bushing 521*b* has an inner hole 522 formed therein with a mouth which serves as a valve seat for a spring-loaded sphere 523, which is pushed by an approximately mushroom-shaped pressure piece 523*a* against the valve seat, by engagement with one end of a spring 523*b*. The other end of the compression coil spring 523*b* is disposed on a spring abutment in the form of a plug 523*d* which is movably sealed in the spring pressure direction in a spring hole 523*c*. The pressure piece 523*a* and the mouth of the hole 522 form approximately hemispherical seating surfaces for the sphere 523. The tension of the coil compression spring 523*b* can be adjusted by means of an adjusting screw 523*e* which is supported in a screw cover 523*f* so that it can be screwed. An inner end of the screw engages in a recess in the spring abutment plug 523*d*, which is not designated in detail. The screw cover 523*f* is secured against rotation by a screw 523*g*. The outer end of the adjusting screw 523*e* is covered up by means of a cap 523*h*. Coaxial with the hole 520 is the hole 520*a* which points downward in FIG. 4. A bushing 524*a* is inserted into an inner section of the hole 520*a* forming an O-ring seal, and a sealing plug 524*b* is inserted into an outer section of the hole 520*a*. A holding piston 524*d* is inserted into the hole 520*a* or actually into the inner surfaces 524*c* of the bushing 524*a*, which is referred to below as a guide bushing. A shaft or needle 525 of the holding piston 524*d* penetrates the inner hole 522 of the inner bushing 521*b* and rests against the spherical body 523. The accumulator pressure of the pressure manifold 11 seen in FIGS. 3 and 15 is fed through a control line 119 and corresponding control holes 119.1 to the lower side of the holding piston 524*d*. The counterpressure on the other side of the holding piston 524*d* is generated by the spherical body 523 together with the compression spring including the counterpressure prevailing in a ring space 526 which surrounds the spherical body 523; this counterpressure is defined by the discharge pressure because the ring space 526 is in communication with the control fluid a60 in the interior of the tank a10 through holes or canals 1190, as is symbolized by an arrow T.

The volume of the hole 522 of the inner bushing 521*b* which surrounds the control pin 525 and the space on the top of the holding piston 524*d* which is in communication therewith, is sealed by the spherical body 523 against the discharge pressure (in the space 526) in the position shown and is held on one hand at the pressure level of the output side of the pump by a control line 1191 (shown by broken lines) which has a choke point b53 that is still ahead of the line branch 1103, as seen from the pressure side of the pump, to the two-way seat valve b51 in FIG. 5. The line 1191 is branched off from the pump pressure side of the two-way seat valve b51, as shown, through a suitable housing canal. An arrow P and the reference numeral 1102 of a broken line section, indicate that the line 1192 is in communication with the pump pressure line 110. The structure of the two-way seat valve b51 is somewhat simpler than that of the above-described servo valve b52. The valve b51 includes a spring-loaded piston 510 disposed within a piston-receiving bore hole 511 of a housing part 502 and a restoring spring 512 for the piston 510. In the switching position shown, the piston 510 seals the pump pressure line 1102 against the discharge line 128 leading all the way to the tank with line portions 128.1 disposed in the housing 502, as indicated by the arrow T. An empty space 511*a* of the bore hole 511 remains on the spring side of the piston 510 in the switching position shown, in which the piston 510 can be immersed in its open position. The choked pressure of the output side of the pump is brought to this empty space through a housing canal 1103.1 and a line branch 1103.

FIG. 5 shows the corresponding circuit diagram as a portion of the circuit according to FIG. 3 and FIG. 15, respectively, but in a more detailed form. Parts which are identical to those of FIG. 4 are provided with the same reference symbols. Corresponding to the customary presentation of these symbols, ISO 1219, the servo valve b52 is shown with two line connections 1191 and 1191', wherein the line section 1191' symbolizes the control function and the line 1191, together with the angled-off arrow and the opposite discharge line 1190 symbolizes the connecting-through and the shut-off function, respectively.

The operation of the overflow valve b5 shown in FIG. 4 and its circuit shown in FIG. 5 are as follows: to begin with it is assumed that the device is in an operating condition I (charging operation), in which the two-way seat valve b51 is closed. The piston 510 is acted on with the same pump pressure on both sides of the piston. I1:e piston is therefore pushed by its coil compression spring 512 onto the seating surfaces 513 of the canal opening. The servo valve b52 is also closed because the pump pressure which extends through the line 1191 and the choke point b53 into the interior 522 of the inner bushing 521*b*, is not yet large enough to lift the sphere 523 from its seat. If, in the charging operation according to FIG. 8, the upper charging pressure $P_{max}$ is reached, i.e., if the accumulators b2 are charged, then this sphere 523 is lifted off its seat, and the pressure prevailing in the inner hole 522 and in the line 1191 behind the choke b53, is relieved through the ring space 526 and the canals 1190 into the tank, as indicated by the arrow T. Due to this instantaneous pressure reduction, the holding piston 524*d* can be displaced upward (in the view shown) by the accumulator pressure $P_{max}$ fed through the line 119 and canals 119.1, so that the piston 524*d* keeps the sphere 523 in the open position with its pin 525. The low pressure level of the discharge side propagates within the line 1191 down to the choke point b53 and is also communicated through the line branch 1103 and the internal canals 1103.1 to the inner or right side of the piston 510 of the two-way seat valve b51. Since the pressure of the pressure side of the pump (such as 2-bar) prevails on the outside or left side of the piston 510 as supplied by the line 1102, the piston 510 is moved into the open position, i.e., it is lifted off its seating surfaces 513, so that the pump pumps into the discharge control fluid a60 of the tank a10 through the canal 128.1 and the line 28. This operating condition can also be designated as discharging operation or recirculating operation (II). The recirculating operation serves for relieving the pump and for saving power. The capacity of the accumulators b2 remains sufficient for control of all of the control processes in the charged condition down to the lower charging pressure $p_m$. Discharge of the accumulators b2 also takes place without control processes due to the unavoidable leakage losses of the hydraulic consuming elements connected to the pressure manifold 11, such as the electrohydraulic servo valve b8, the position sliders c4, or the seat valves c5.

Switching from the operating condition II to I takes place if the accumulator pressure has fallen to the lower charging pressure $p_m$. This pressure $p_m$ is no longer sufficient to hold the holding piston **524*d* in its open position against the force of the spring 523*b*; the holding piston 524*d* is therefore pushed back into its starting position (seen in FIG. 4) by the sphere 523 and the pin 525; the sphere 523 settles into its lower seating surface and seals the hole 522 toward the discharge direction, so that the pressure in the line 1191 rises to the pressure of the output side of the pump and to 2-bar, for instance. The same pressure therefore prevails on both sides of the piston 510 of the valve b51, so that this valve closes and the pump pressure which is now building up in the line 1110 (seen in FIG. 3 and FIG. 15) and which rises beyond $p_m$, opens the check valve b6. This rising pump pressure is communicated through the choke point b53 to the respective inner or left side of the piston 510 and the inner or lower side of the holding piston 524*d*, so that the piston 524*d* remains in its closed position, like the two-way seat valve b51, until the accumulator pressure has again reached the upper value $p_{max}$, and switching from the operating condition I to II then takes place again. Instead of the purely hydraulic operation of the servo valve, an electrohydraulic servo control can also be used for the two-way seat valve b51. This occurs due to the fact that the pressure measuring transducer shown in FIG. 16, which measures the pressure in the pressure manifold 11 and converts it into an electrical analog quantity, controls a non-illustrated electromagnetic valve which in turn connects the line 1191 with the discharge when $p_{max}$ is reached, and is switched-over if the accumulator pressure is dropped to $p_m$ by the pressure measuring transmitter b500 in such a way that it interrupts the connection from the line 1191 to the discharge with its control slider The lower half of FIG. 16 shows a further variation of the blower hood e3 according to FIG. 17, wherein the cooling air flow which is generated by the blower e2 is simultaneously illustrated by arrows e30. The hood e3 in FIG. 16 has a hood extension e31 shown in broken lines which surrounds the housing and the container a10 defining a ring gap e32 approximately along the plane of the coupling a1 normal to the axis. The cooling air is forced to flow in a ring space e33 which has a changing gap width e32. The cooling air flows along cooling fins a102 of the container a10. The air then leaves through a mouth e330 of the ring space e33, as illustrated by arrows e30. Cooling with the extended hood e3, e31, provides a better heat supply in comparison with cooling by means of the short hood e3 according to FIG. 17. The hood extension e31 preferably surrounds the container a10 in vicinity of the periphery of the cooling fins a102**, at least approximately in the form of a semicircle.

Regarding the two-way seat valve b51, it should be added that a stop body 514, which is disposed at the bottom of the piston-containing bore hole 511, is provided. The stop body 514 has a disc-shaped base part **514*a* and carries a cup spring 514*c* on a shank part 514*b* which can dip into the spring retaining hole of the piston 510, which is not specifically designated. The stop body 514 is provided with non-illustrated slits, for the passage of the pressurized medium from the canal 103.1 to the empty space 511*a***.

The foregoing is a description corresponding in substance to German Application No. P 34 00 488.2, dated Jan. 9, 1984, the International priority of which is being claimed for the instant application and which is hereby made part of this application. Any material discrepancies between the foregoing specification and the aforementioned corresponding German application are to be resolved in favor of the latter. The International priority of German application No. P 33 09 421, filed Mar. 16, 1983 is also claimed.

We claim:

1. Electrohydraulic compact drive for turbomachine valves having valve housings and spindles, comprising:
   - means for supplying electric power and for receiving electrical addressing signals;
   - means connected to said supplying and receiving means for converting said signals into corresponding hydraulic positioning and control variables;
   - a self-sufficient hydraulic supply system including a hydraulic fluid tank for hydraulic fluid connected to said converting means, means for cooling the hydraulic fluid, at least one fluid pump having an inlet side fed by said fluid tank and an outlet side, an electric motor driving said fluid pump, at least one hydraulic accumulator with a given usable volume connected to said outlet side of said pump, and a hydraulic manifold connected to said at least one accumulator;
   - a hydraulic power system including a control cylinder, a power piston movable in said cylinder, a piston rod connected from said piston to the valve spindle of a turbomachine valve, and shutoff spring biasing said piston with a closing motion in a closing direction of the valve spindle, said shutoff spring being formed as a stack of cup springs;
   - an electrohydraulic addressing system including control means connected to said hydraulic manifold, to said hydraulic power system and to said hydraulic fluid tank for generating a pressurized fluid flow from said at least one accumulator to said hydraulic power system causing an opening motion of the valve spindle against the force of said shutoff spring dependent upon said positioning and control variables;
   - said control means of said electrohydraulic addressing system, said hydraulic power system and said hydraulic supply system being integrated into a compact drive block disposed at the housing of a turbomachine valve;
   - said at least one gluid pump producing a system pressure at said outlet side thereof up to a given pressure limit, said system pressure being several times higher than the fluid pressure of substantially 36-bar in conventional electrohydraulic control drives with a central fluid pressure supply;
   - minimum and maximum pressure switch means for connecting said outlet side of said at least one fluid pump intermittently to a pressure line for charging said at least one accumulator and to an outlet side of said hydraulic fluid tank;

said pressure switch means enabling said at least one pump to charge said at least one accumulator in said charging operation until said upper charging pressure is reached and returning the hydraulic fluid to said hydraulic fluid tank in substantially pressureless circulating operation after one of said switching operations, until said lower charging pressure is reached and one of said switching operations switches to said charging operation depending on said pressure limit;

housing sections of said hydraulic supply system, said hydraulic power system and said electrohydraulic addressing system, a central supporting cup-shaped housing for said housing sections, said shutoff spring being guided on said piston rod, said hydraulic fluid tank being in the form of an installation space for said shutoff spring and said cup-shaped housing; and said usable accumulator volume and said lower charging pressure being sufficiently high for extreme control processes such that:

$$AV = \int_{P_{min}}^{P_m} p dv$$

is available, where

AV is the work capacity of said at least one accumulator, $P_{min}$ is the minimum operating pressure of said supply system, $P_m$ is said lower charging pressure, and dv is the time-dependent increase of the equalizing volume of said accumulator for decreasing accumulator pressure.

2. Compact drive according to claim 1 wherein said shutoff spring is disposed outside said control cylinder and has a spring diameter which is larger than the diameter of said power piston.

3. Compact drive according to claim 1, wherein said shutoff spring is disposed outside said control cylinder and has a spring diameter which is larger than the diameter of said power piston.

4. Compact drive according to claim 1, wherein said shutoff spring is cocked in an open condition of the valve spindle, said hydraulic power system is acted upon in one direction, said power piston has one side acted upon by pressure, and said pressurized fluid flow causes hydraulic pressure relief of said one side of said power piston for said closing motion, releasing said shutoff spring.

5. Compact drive according to claim 1, wherein said at least one pump operates by the displacement principle.

6. Compact drive according to claim 5, wherein said at least one pump is a rotary piston pump.

7. Compact drive according to claim 6, wherein said at least one pump is an internal gear pump.

8. Electrohydraulic compact drive for turbomachine valves having valve housings and spindles, comprising:

means for supplying electric power and for receiving electrical addressing signals;

means connected to said supplying and receiving means for converting said signals into corresponding hydraulic positioning and control variables;

a self-sufficient hydraulic supply system including a hydraulic fluid tank for hydraulic fluid connected to said converting means, means for cooling the hydraulic fluid, at least one fluid pump having an inlet side fed by said fluid tank and an outlet side, an electric motor driving said fluid pump, at least one hydraulic accmulator with a given usable volume connected to said outlet side of said pump, and a hydraulic manifold connected to said at least one accumulator;

a hydraulic power system including a control cylinder, a power piston movable in said cylinder, a piston rod connected from said piston to the valve spindle of a turbomachine valve, and a shutoff spring biasing said piston with a closing motion in a closing direction of the valve spindle, said shutoff spring being formed as stack of cup springs;

an electrohydraulic addressing system including control means connected to said hydraulic manifold, to said hydraulic power system and to said hydraulic fluid tank for generating a pressurized fluid flow from said at least one accumulator to said hydraulic power system causing an opening motion of the valve spindle against the force of said shutoff spring dependent upon said positioning and control variables;

said control means of said electrohydraulic addressing system, said hydraulic power system and said hydraulic supply system being integrated into a compact drive block disposed at the housing of a turbomachine valve;

said at least one fluid pump producing a system pressure at said outlet side thereof up to a given pressure limit, said system pressure being several times higher than the fluid pressure of substantially 36-bar in conventional electrohydraulic control drives with a central fluid pressure supply;

minimum and maximum pressure switch means for connecting said outlet side of said at least one fluid pump intermittently to a pressure line for charging said at least one accumulator and to an outlet side of said hydraulic fluid tank;

said pressure switch means enabling said at least one pump to charge said at least one accumulator in said charging operation until said upper charging pressure is reached and returning the hydraulic fluid to said hydraulic fluid tank in substantially pressureless circulating operation after one of said switching operations, until said lower charging pressure is reached and one of said switching operations switches to said charging operation depending on said pressure limit;

a pressure line leading from said outlet side of said pump to said accumulator, said pressure switch means being in the form of at least one overflow valve serving as an accumulator charging valve connected to said pressure line of said pump, a run-off line connected from said over flow valve to said hydraulic fluid tank having a given inlet cross section, said overflow valve having a seat valve controlled by pressure from said accumulator, said pump and said run-off, said seat valve connecting said outlet side of said pump to said hydraulic fluid tank if said upper charging pressure of said accumulator is reached in said charging operation, a check valve connected to said pressure line downstream of said overflow valve as seen from said pump, said check valve being opened and said given inlet cross section of said run-off line being closed by said seat valve so as to connect said outlet side of said pump via said pressure line of said pump to said accumulator is the charging pressure of said accumulator has dropped to said lower charging pressure in said discharging operation of said accumulator;

said seat valve of said overflow valve being a two-way seat valve functioning in open, closed and pressure valve operation, and said overflow valve also including a pressure-dependent servo stage upstream of said valve seat; and said usable accumulator volume and said lower charging pressure being sufficiently high for extreme control processes such that:

$$AV = \int_{P_{min}}^{P_m} pdv$$

is available, where

AV is the work capacity of said at least one accumulator, $P_{min}$ is the minimum operating pressure of said supply system, $P_m$ is said lower charging pressure, and dv is the time-dependent increase of the equalizing volume of said accumulator for decreasing accumulator pressure.

9. Compact drive according to claim 8, wherein said servo stage is a pressure-dependent hydraulic discrete resistance for relieving and charging said two-way seat valve when said respective upper charging pressure and lower charging pressure are reached by respectively opening and closing a control cross section.

10. Compact drive according to claim 9, wherein said servo stage is spring-loaded.

11. Compact drive according to claim 8, wherein said servo stage includes a hydraulic-electrically operating pressure measuring transducer and a magnetic valve connected to said measuring transducer for receiving limit signals of said upper and lower charging pressures from said measuring transducer and for opening and closing said two-way seat valve in dependence on said limit signals.

* * * * *